(12) United States Patent
Grieshop et al.

(10) Patent No.: US 12,715,705 B2
(45) Date of Patent: Aug. 25, 2026

(54) SEED TENDER WITH AUTOMATIC CONVEYOR POSITIONING

(71) Applicant: J. & M. Manufacturing Co., Inc., Ft. Recovery, OH (US)

(72) Inventors: Dustan Grieshop, Ft. Recovery, OH (US); Brad Hemmelgarn, Ft. Recovery, OH (US)

(73) Assignee: J. & M. Manufacturing Co., Inc., Ft. Recovery, OH (US)

( * ) Notice: Subject to any disclaimer, the term of this patent is extended or adjusted under 35 U.S.C. 154(b) by 63 days.

(21) Appl. No.: 19/009,352

(22) Filed: Jan. 3, 2025

(65) Prior Publication Data

US 2025/0223113 A1 Jul. 10, 2025

Related U.S. Application Data

(60) Provisional application No. 63/664,469, filed on Jun. 26, 2024, provisional application No. 63/617,596, filed on Jan. 4, 2024.

(51) Int. Cl.

| | |
|---|---|
| ***A01D 90/10*** | (2006.01) |
| ***B65G 41/00*** | (2006.01) |
| ***B65G 65/42*** | (2006.01) |
| ***B65G 67/08*** | (2006.01) |
| *A01C 15/00* | (2006.01) |

(52) U.S. Cl.
CPC ......... *B65G 41/005* (2013.01); *B65G 65/425* (2013.01); *A01C 15/003* (2013.01)

(58) Field of Classification Search
CPC .... B65G 41/005; B65G 65/425; B65G 67/08; A01D 90/10
See application file for complete search history.

(56) References Cited

U.S. PATENT DOCUMENTS

| | | | | |
|---|---|---|---|---|
| 8,794,900 | B2 * | 8/2014 | Friggstad | B60P 1/36 414/526 |
| 8,974,170 | B2 * | 3/2015 | Ryder | B65G 41/002 414/327 |
| 9,392,742 | B2 * | 7/2016 | Boston | B60P 1/42 |
| 10,150,400 | B2 * | 12/2018 | Wood | B60P 1/36 |
| 11,014,753 | B1 * | 5/2021 | Hirman | B65G 23/44 |
| 11,014,760 | B2 * | 5/2021 | Borkgren | B65G 41/002 |
| 11,104,258 | B2 * | 8/2021 | Grieshop | B60P 1/42 |
| 11,140,829 | B2 * | 10/2021 | Van Mill | A01F 12/46 |

(Continued)

*Primary Examiner* — Douglas A Hess
(74) *Attorney, Agent, or Firm* — Rooney IP, LLC

(57) ABSTRACT

A seed tender includes a supplying container configured to hold seed and a conveyor configured to transfer the seed to a receiving container. The seed tender includes first and second actuators configured to selectively control the movement of the conveyor. The seed tender includes a sensor system configured to detect at least one of an object in a path of movement of the conveyor, a position of the conveyor, or an orientation of the conveyor. The seed tender includes an electronic control unit configured to receive a signal from the sensor system and to selectively energize and de-energize the first and second actuators based at least in part on the signal from the sensor system. The controlled movement of the conveyor is at least partially based on at least one of the detected object, the detected position of the conveyor, or the detected orientation of the conveyor.

44 Claims, 21 Drawing Sheets

(56) References Cited

U.S. PATENT DOCUMENTS

| | | | | |
|---|---|---|---|---|
| 12,419,217 | B2 * | 9/2025 | Grieshop | A01D 41/1278 |
| 2020/0180493 | A1 * | 6/2020 | Thompson | |
| 2020/0354154 | A1 | 11/2020 | Grieshop | |
| 2021/0107744 | A1 * | 4/2021 | Borkgren | |
| 2023/0148475 | A1 * | 5/2023 | Reed et al. | |
| 2024/0103123 | A1 * | 3/2024 | Meier et al. | |
| 2024/0196780 | A1 * | 6/2024 | Faust et al. | |
| 2024/0224875 | A1 * | 7/2024 | Sauer et al. | |
| 2025/0160257 | A1 * | 5/2025 | Kahlig et al. | |
| 2025/0241245 | A1 * | 7/2025 | Neitemeier et al. | |
| 2026/0101851 | A1 * | 4/2026 | O'Connor et al. | |

* cited by examiner 16
14
128
126
12
10
120
144
140
130
160
110
124
172
118b
116
142
118a
102
112
122
158
100

SEED TENDER WITH AUTOMATIC CONVEYOR POSITIONING

CROSS REFERENCE TO RELATED APPLICATION

This application claims the priority of U.S. Provisional Patent Application Ser. No. 63/617,596, filed on Jan. 4, 2024, and U.S. Provisional Patent Application Ser. No. 63/664,469 filed on Jun. 26, 2024, the disclosures of which are incorporated herein by reference in their entirety.

TECHNICAL FIELD

Embodiments relate generally to agricultural equipment, and specifically to the control of conveyors such as those found on seed tenders, and related methods.

BACKGROUND

Vehicles for receiving and delivering seeds are commonly referred to as seed tenders and include a container having one or more open top bins for receiving a type of seed or different types of seed and for delivering the seed to an agricultural seed planter. Commonly, the seed tender includes an elongated conveyor which can be positioned for receiving the seeds from each bin of the seed tender and elevating and delivering the seeds to seed hoppers on the planter.

Conventional methods for controlling an actuated seed tender conveyor include using a handheld control device, either hardwired or wireless, equipped with toggle switches and/or buttons to control the movement and operation of the conveyor. Controlling the conveyor on a seed tender in an unloading mode involves multiple button pushes by the operator in the correct sequence and timing to correctly position the conveyor while avoiding obstacles like the conveyor rest, seed tank, and fenders. A particularly cumbersome task includes docking or undocking the conveyor into or out of the conveyor rest before or after transport. This may involve moving the conveyor up to clear the conveyor rest or down to clear the seed tank while swinging the conveyor into or out of the conveyor rest position. When swinging the conveyor into the rest position the operator could accidentally overshoot the rest position requiring the operator to reverse the swing direction of the conveyor. Since the conveyor rotates around an axis and is inclined from under the seed tank and the general shape of the seed tender is square, the top of the conveyor may clear the seed tank when positioned perpendicular to the seed tank but may contact the seed tank as the conveyor is rotated forwards or backwards, without a change in height by the operator. Additionally, the bottom of the conveyor may clear the fenders when positioned on an angle towards the front or the rear of the seed tender but may contact the fenders when rotated relative to the seed tank, without a change in height by the operator.

Maneuvering the conveyor in and out of self-fill mode is even more arduous. First, the operator needs to undock the conveyor and position it about a 45° angle to the front or rear of the seed tank. Next, the operator needs to unlatch the bottom of the conveyor to allow it to swing out from under the seed tank. Once unlatched, the operator must lift the inlet of the conveyor above the fenders, scale box, and other obstacles, and manually rotate the inlet out from under the seed tank. Next, the conveyor needs to be manually positioned so the outlet is located above the compartment which the operator wishes to dispense seed into. Since the conveyor can weigh upwards of 1000 pounds, manually moving the conveyor can be difficult. The center of mass of the conveyor must be slightly to the inlet or bottom side of the conveyor so it always remains stable and will sit on the ground. This results in at least 25-50 pounds of weight that the operator must lift when maneuvering the conveyor in self-fill mode.

Accordingly, and despite the various advances already made in this field, there is a need for further improvements related to the control of conveyors and conveyor spouts, and specifically the control of seed tender conveyors and conveyor spouts.

SUMMARY

Generally, a seed tender is provided. The seed tender includes a supplying container, a conveyor operatively coupled to the supplying container, a first actuator, a second actuator, a sensor system, and an electronic control unit. The supplying container is configured to hold seed and the conveyor is configured to transfer the seed from the supplying container to a receiving container. The conveyor is configured to rotate about a first axis of rotation and a second axis of rotation and to be selectively moved into at least one of a transport position, an unload position, or a self-fill position. The first actuator is operatively coupled to the conveyor and is configured to selectively control the movement of the conveyor about the first axis of rotation when the first actuator is energized. The second actuator is operatively coupled to the conveyor and is configured to selectively control the movement of the conveyor about the second axis of rotation when the second actuator is energized. The sensor system is configured to detect at least one of an object in a path of movement of the conveyor, a position of the conveyor, or an orientation of the conveyor. The electronic control unit is configured to receive a signal from the sensor system and to selectively energize and de-energize the first actuator and the second actuator based at least in part on the signal from the sensor system. The controlled movement of the conveyor caused by the first actuator and the second actuator is at least partially based on at least one of the detected object, the detected position of the conveyor, or the detected orientation of the conveyor. The seed tender described herein addresses at least some of the operational challenges related to the control of a plurality of actuators used to control the movement of a conveyor thereby allowing for the correct positioning of the conveyor while avoiding obstacles.

In some embodiments, the electronic control unit may be configured to be programmed to selectively move the conveyor into at least one of the transport position, the unload position, or the self-fill position. The electronic control unit may be configured to selectively store a signal from the sensor system when the conveyor is in an operator selected position thereby programming the electronic control unit. The electronic control unit may be configured to selectively energize and de-energize the first actuator and the second actuator to move the conveyor into the operator selected position. The sensor system may include a first sensor configured to detect at least one of an object in a path of movement of the conveyor, a position of the conveyor, or an orientation of the conveyor. The sensor system may include a second sensor configured to detect at least one of an object in a path of movement of the conveyor, a position of the conveyor, or an orientation of the conveyor. The electronic control unit may be configured to receive signals from the first sensor and the second sensor and to selectively energize and de-energize the first actuator and the second actuator based at least in part on the signals from the first sensor and the second sensor.

In alternative embodiments, the seed tender may include an unload position latch configured to secure an inlet end of the conveyor and an unload position latch actuator configured to activate the unload position latch to at least one of secure the inlet end of the conveyor when the conveyor is moved into the unload position or release the inlet end of the conveyor when the conveyor is moved out of the unload position. The seed tender may include a transport position latch configured to secure the conveyor when the conveyor is in the transport position and a transport position latch actuator configured to activate the transport position latch to secure the conveyor when the conveyor is moved into the transport position or release the conveyor when the conveyor is moved out of the transport position.

In alternative or additional aspects, the seed tender may include a hydraulic float valve operatively coupled to at least one of the first actuator or the second actuator. When the hydraulic float valve is in a valve float mode, at least one of the first actuator or the second actuator may be in an actuator float mode and the conveyor may be free to rotate about at least one of the first axis of rotation or the second axis of rotation. The unload position may be a first unload position and the hydraulic float valve may be in the valve float mode when the conveyor moves between the first unload position and a second unload position. The hydraulic float valve may be in the valve float mode when the conveyor moves between the transport position and the unload position.

An alternative seed tender is provided. The seed tender includes a supplying container, a conveyor operatively coupled to the supplying container, a first actuator, a second actuator, a third actuator, a sensor system, and an electronic control unit. The supplying container is configured to hold seed and the conveyor is configured to transfer the seed from the supplying container to a receiving container. The conveyor is configured to rotate about a first axis of rotation, a second axis of rotation, and a third axis of rotation. The conveyor is configured to be selectively moved into at least one of a transport position, an unload position, or a self-fill position. The first actuator is operatively coupled to the conveyor and is configured to selectively control the movement of the conveyor about the first axis of rotation when the first actuator is energized. The second actuator is operatively coupled to the conveyor and is configured to selectively control the movement of the conveyor about the second axis of rotation when the second actuator is energized. The third actuator is operatively coupled to the conveyor and is configured to selectively control the movement of the conveyor about the third axis of rotation when the third actuator is energized. The sensor system is configured to detect at least one of an object in a path of movement of the conveyor, a position of the conveyor, or an orientation of the conveyor. The electronic control unit is configured to receive a signal from the sensor system and to selectively energize and de-energize the first actuator, the second actuator, and the third actuator based at least in part on the signal from the sensor system. The controlled movement of the conveyor caused by the first actuator, the second actuator, and the third actuator is at least partially based on at least one of the detected object, the detected position of the conveyor, or the detected orientation of the conveyor.

In some embodiments, the electronic control unit may be configured to be programmed to selectively move the conveyor into at least one of the transport position, the unload position, or the self-fill position. The electronic control unit may be configured to selectively store a signal from the sensor system when the conveyor is in an operator selected position thereby programming the electronic control unit. The electronic control unit may be configured to selectively energize and de-energize the first actuator, the second actuator, and the third actuator to move the conveyor into the operator selected position. The sensor system may include a first sensor configured to detect at least one of an object in a path of movement of the conveyor, a position of the conveyor, or an orientation of the conveyor. The sensor system may include a second sensor configured to detect at least one of an object in a path of movement of the conveyor, a position of the conveyor, or an orientation of the conveyor. The electronic control unit may be configured to receive signals from the first sensor and the second sensor and to selectively energize and de-energize the first actuator, the second actuator, and the third actuator based at least in part on the signals from the first sensor and the second sensor.

In alternative embodiments, the seed tender may include an unload position latch configured to secure an inlet end of the conveyor and an unload position latch actuator configured to activate the unload position latch to at least one of secure the inlet end of the conveyor when the conveyor is moved into the unload position or release the inlet end of the conveyor when the conveyor is moved out of the unload position. The seed tender may include a transport position latch configured to secure the conveyor when the conveyor is in the transport position and a transport position latch actuator configured to activate the transport position latch to secure the conveyor when the conveyor is moved into the transport position or release the conveyor when the conveyor is moved out of the transport position.

The seed tender may include a hydraulic float valve operatively coupled to at least one of the first actuator, the second actuator, or the third actuator. When the hydraulic float valve is in a valve float mode, at least one of the first actuator, the second actuator, or the third actuator may be in an actuator float mode and the conveyor may be free to rotate about at least one of the first axis of rotation, the second axis of rotation, or the third axis of rotation. The unload position may be a first unload position and the hydraulic float valve may be in the valve float mode when the conveyor moves between the first unload position and a second unload position. The hydraulic float valve may be in the valve float mode when the conveyor moves between the transport position and the unload position.

Another alternative seed tender is provided. The seed tender includes a frame, a supplying container, a support arm, a conveyor, a first actuator, a second actuator, a third actuator, a sensor system, and an electronic control unit. The supplying container is coupled to the frame and is configured to hold seed and the conveyor is configured to transfer the seed from the supplying container to a receiving container. The support arm is movably coupled to at least one of the frame or the supplying container. The conveyor is movably coupled to the support arm. The conveyor is configured to rotate about a first axis of rotation, a second axis of rotation, and a third axis of rotation and to be selectively moved into at least one of a transport position, an unload position, or a self-fill position. The first actuator is coupled to at least one of the frame, the supplying container, the support arm, or the conveyor. The first actuator is configured to selectively control the movement of the conveyor about the first axis of rotation when the first actuator is energized. The second actuator is coupled to at least one of the frame, the supplying container, the support arm, or the conveyor. The second actuator is configured to selectively control the movement of the conveyor about the second axis of rotation when the second actuator is energized. The third actuator is coupled to at least one of the support arm or the conveyor. The third actuator is configured to selectively control the movement of the conveyor about the third axis of rotation when the third actuator is energized. The sensor system is configured to detect at least one of an object in a path of movement of the conveyor, a position of the conveyor, or an orientation of the conveyor. The electronic control unit is configured to receive signals from the sensor system and to energize the first actuator, the second actuator, and the third actuator based at least in part on the signal from the sensor system. The controlled movement of the conveyor caused by the first actuator, the second actuator, and the third actuator is at least partially based on at least one of the detected object, the detected position of the conveyor, or the detected orientation of the conveyor.

In some embodiments, the electronic control unit may be configured to be programmed to selectively move the conveyor into at least one of the transport position, the unload position, or the self-fill position. The electronic control unit may be configured to selectively store a signal from the sensor system when the conveyor is in an operator selected position thereby programming the electronic control unit. The electronic control unit may be configured to selectively energize and de-energize the first actuator, the second actuator, and the third actuator to move the conveyor into the operator selected position. The sensor system may include a first sensor configured to detect at least one of an object in a path of movement of the conveyor, a position of the conveyor, or an orientation of the conveyor. The sensor system may include a second sensor configured to detect at least one of an object in a path of movement of the conveyor, a position of the conveyor, or an orientation of the conveyor. The electronic control unit may be configured to receive signals from the first sensor and the second sensor and to selectively energize and de-energize the first actuator, the second actuator, and the third actuator based at least in part on the signals from the first sensor and the second sensor.

In alternative embodiments, the conveyor may be configured to rotate about a fourth axis of rotation. The seed tender may include a fourth actuator. The fourth actuator may be coupled to at least one of the support arm or the conveyor and configured to selectively control the movement of the conveyor about the fourth axis of rotation when the fourth actuator is energized. The electronic control unit may be configured to energize the fourth actuator based at least in part on the signal from the sensor system. The electronic control unit may be configured to selectively energize and de-energize the first actuator, the second actuator, the third actuator, and the fourth actuator to move the conveyor into the operator selected position. The conveyor may be configured to rotate about a fifth axis of rotation. The seed tender may include a fifth actuator. The fifth actuator may be coupled to at least one of the support arm or the conveyor and configured to selectively control the movement of the conveyor about the fifth axis of rotation when the fifth actuator is energized. The electronic control unit may be configured to energize the fifth actuator based at least in part on the signal from the sensor system. The electronic control unit may be configured to selectively energize and de-energize the first actuator, the second actuator, the third actuator, the fourth actuator, and the fifth actuator to move the conveyor into the operator selected position.

In alternative or additional aspects, the support arm may include an inner support arm and an outer support arm. The inner support arm may include a first inner support arm end portion and a second inner support arm end portion. The first inner support arm end portion may be movably coupled to at least one of the frame or the supplying container. The outer support arm may include a first outer support arm end portion and a second outer support arm end portion. The first outer support arm end portion may be movably coupled to the second inner support arm end portion. The conveyor may be movably coupled to the second outer support arm end portion. The fifth actuator may be coupled to the inner support arm and the outer support arm. The fifth actuator may be configured to move the outer support arm relative to the inner support arm. The sensor system may include a tilt angle sensor configured to detect a tilt angle of the conveyor. The electronic control unit may be configured to receive a signal from the tilt angle sensor. The controlled movement of the conveyor caused by the first actuator, the second actuator, and the third actuator may be based at least partially on the detected tilt angle of the conveyor.

In alternative embodiments, the seed tender may include an unload position latch configured to secure an inlet end of the conveyor and an unload position latch actuator configured to activate the unload position latch to at least one of secure the inlet end of the conveyor when the conveyor is moved into the unload position or release the inlet end of the conveyor when the conveyor is moved out of the unload position. The seed tender may include a transport position latch configured to secure the conveyor when the conveyor is in the transport position and a transport position latch actuator configured to activate the transport position latch to secure the conveyor when the conveyor is moved into the transport position or release the conveyor when the conveyor is moved out of the transport position.

The seed tender may include a hydraulic float valve operatively coupled to at least one of the first actuator, the second actuator, or the third actuator. When the hydraulic float valve is in a valve float mode, at least one of the first actuator, the second actuator, or the third actuator may be in an actuator float mode and the conveyor may be free to rotate about at least one of the first axis of rotation, the second axis of rotation, or the third axis of rotation. The unload position may be a first unload position and the hydraulic float valve may be in the valve float mode when the conveyor moves between the first unload position and a second unload position. The hydraulic float valve may be in the valve float mode when the conveyor moves between the transport position and the unload position.

Generally, a method of positioning a conveyor is provided. The method including detecting at least one of an object in a path of movement of a conveyor, a position of the conveyor, or an orientation of the conveyor, selectively energizing and de-energizing a first actuator and a second actuator. Selectively energizing and de-energizing the first actuator selectively moves the conveyor around a first axis of rotation based at least in part on the detected object, the detected position of the conveyor, or the detected orientation of the conveyor. Selectively energizing and de-energizing the second actuator selectively moves the conveyor around a second axis of rotation based at least in part on the detected object, the detected position of the conveyor, or the detected orientation of the conveyor.

In some embodiments, the method may include selectively energizing and de-energizing at least one of the first actuator or the second actuator to selectively move the conveyor into at least one of a transport position, an unload position, or a self-fill position. The conveyor may be configured for transport when the conveyor is in the transport position. The conveyor may be configured to unload a supplying container when the conveyor is in the unload position. The conveyor may be configured to fill the supplying container when the conveyor is in the self-fill position. The method may include detecting an operator selected position and selectively energizing and de-energizing at least one of the first actuator or the second actuator to selectively move the conveyor into the operator selected position. The method may include receiving an electronic signal and selectively energizing and de-energizing at least one of the first actuator or the second actuator based at least in part on the electronic signal. The method may include storing the electronic signal and selectively energizing and de-energizing at least one of the first actuator or the second actuator based at least in part on the stored electronic signal. The method may include selectively placing at least one of the first actuator or the second actuator in an actuator float mode thereby allowing the conveyor to move freely around at least one of the first axis of rotation or the second axis of rotation.

In alternative embodiments, the method may include activating an unload position latch to secure the conveyor when the conveyor is moved into an unload position or release the conveyor when the conveyor is moved out of the unload position. The method may include activating a transport position latch to secure the conveyor when the conveyor is moved into a transport position or release the conveyor when the conveyor is moved out of the transport position. The method may include selectively energizing and de-energizing a third actuator to selectively move the conveyor around a third axis of rotation based at least in part on the detected object, the detected position of the conveyor, or the detected orientation of the conveyor. The method may include selectively energizing and de-energizing a fourth actuator to selectively move the conveyor around a fourth axis of rotation based at least in part on the detected object, the detected position of the conveyor, or the detected orientation of the conveyor. The method may include selectively energizing and de-energizing a fifth actuator to selectively move the conveyor around a fifth axis of rotation based at least in part on the detected object, the detected position of the conveyor, or the detected orientation of the conveyor.

Additional aspects and advantages of the invention will become more apparent upon further review of the detailed description of the illustrative embodiments taken in conjunction with the accompanying drawings.

DETAILED DESCRIPTION

Figure 1:
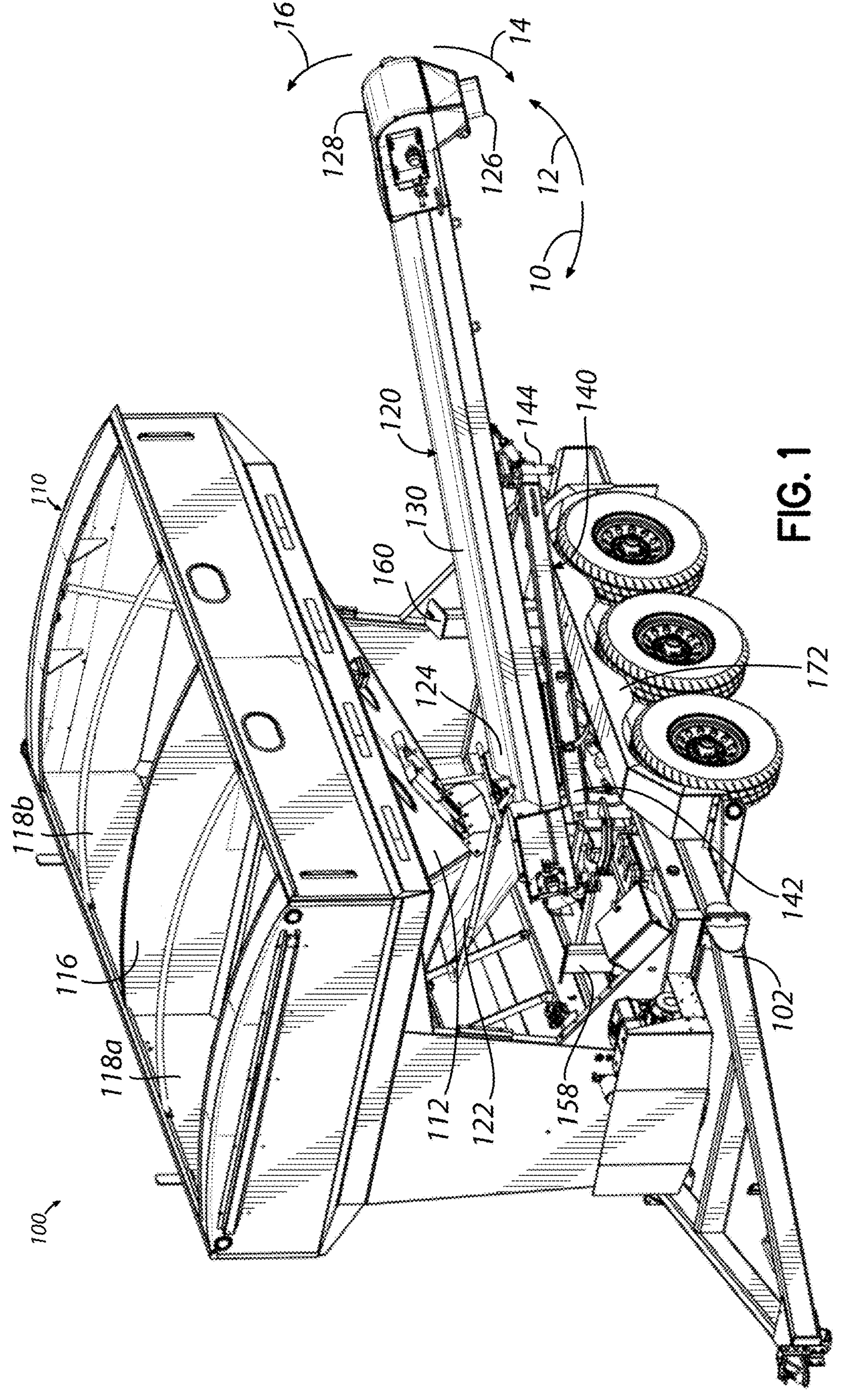
FIG. 1 is a perspective view of an illustrative seed tender with a conveyor in an unload position.
Figure 2:
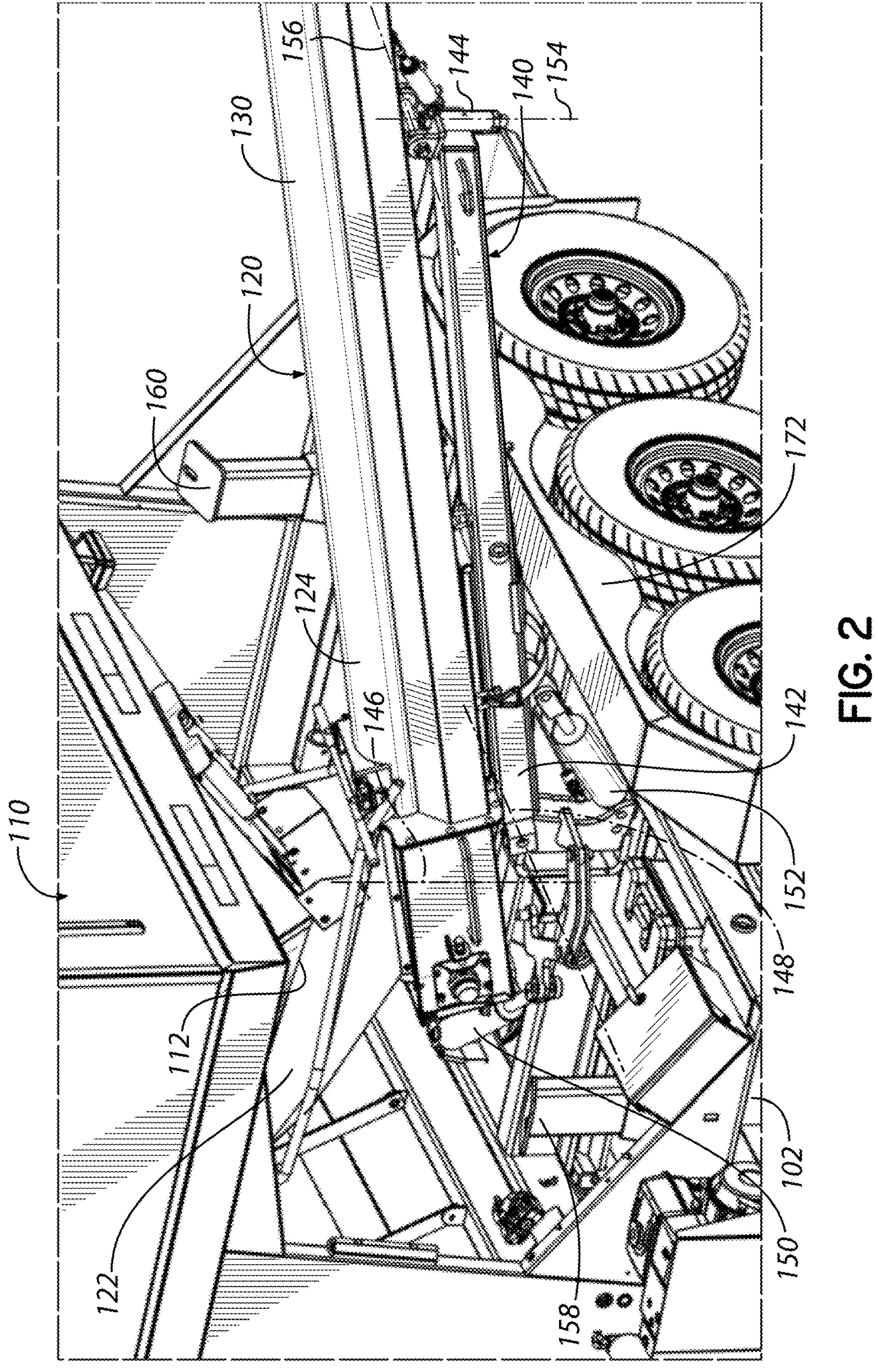
FIG. 2 is a perspective view of an inlet end portion of a conveyor positioned under an outlet of a container of the seed tender of FIG. 1.

FIG. 1 is a perspective view of an illustrative seed tender 100 where a conveyor 120 is in an unload position to unload seed from a container 110, such as a seed tank, into a receiving container, such as a seed bin of a planter, for example. The container 110 includes a dividing wall 116 separating front and rear hoppers 118*a*, 118*b*. FIG. 2 is a perspective view of a hopper 122 of an inlet end portion 124 of the conveyor 120 positioned under an outlet 112 of the container 110 when the conveyor 120 is in an unload position, such as the unload position shown in FIG. 1. It should be understood the conveyor 120 may be placed in any number of unload positions depending on the location and orientation of the seed tender 100 relative to the location and orientation of a receiving container, such as a seed bin of a planter, for example. Seed is discharged from the front and/or rear hopper 118*a*, 118*b* through the outlet 112 of the container 110 into the hopper 122 of the conveyor 120 and the seed is carried by the conveyor 120 to a discharge spout 126 at an outlet end portion 128 of the conveyor 120 where the seed is discharged.

The seed tender 100 includes a support arm 140 located under the conveyor 120 and configured to support the conveyor 120. The support arm 140 includes a lower end portion 142 movably coupled to a frame 102 and an upper end portion 144 coupled to a mid-portion 130 of the conveyor 120. The support arm 140 is configured to rotate about a generally vertical axis 146 and a generally horizontal axis 148 near the lower end portion 142. When the seed tender

100 is in an unload configuration, moving the support arm 140 around the vertical axis 146 moves the upper end portion 144 and the discharge spout 126 of the conveyor 120 generally in an arc in the direction of arrows 10, 12. When the seed tender 100 is in an unload configuration, moving the support arm 140 around the horizontal axis 148 moves the upper end portion 144 and the discharge spout 126 of the conveyor 120 up and down in the direction of arrows 14, 16. The seed tender 100 includes a swing actuator 150 configured to control the movement of the support arm 140 around the vertical axis 146 and a lift actuator 152 configured to control the movement of the support arm 140 around the horizontal axis 148. The swing actuator 150 and the lift actuator 152 are operatively coupled to the conveyor 120 as further described herein. In this illustrative embodiment, the actuators 150, 152 are hydraulic cylinders. In other embodiments, the actuators 150, 152 may be linear actuators, motors, or any other type of actuator configured to move the support arm 140 as described herein. Movement of the support arm 140, and thereby the conveyor 120, may be controlled by an operator by entering command inputs, such as by activating buttons or switches, into a controller for example. An operator may enter a command input into a controller to energize the swing actuator 150 to move the discharge spout 126 in the directions of arrows 10, 12, for example. An operator may enter a command input into a controller to energize the lift actuator 152 to raise and lower the discharge spout 126 in the directions of arrows 14, 16, for example.

Figure 3:
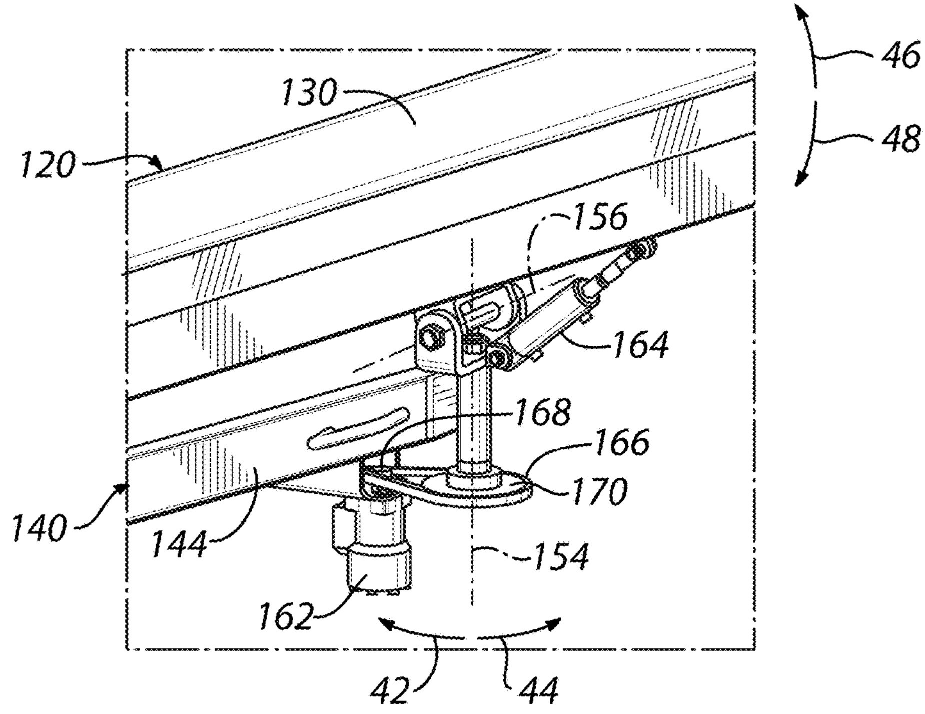
FIG. 3 is a perspective view of an upper end portion of a support arm supporting the conveyor of the seed tender of FIG. 1.

FIG. 3 is a perspective view of the upper end portion 144 of the support arm 140 detailing the conveyor 120 movably coupled to the support arm 140. The conveyor 120 is configured to rotate about a generally vertical axis 154 and a generally horizontal axis 156. In some embodiments, support arm 140 may be a parallel linkage to maintain the orientation of the vertical axis 154. A rotation actuator 162 and a tilt actuator 164 are operatively coupled to the support arm 140 and the conveyor 120. In this illustrative embodiment, the rotation actuator 162 is mounted the support arm 140 and is coupled the conveyor 120 with a chain 166 and a pair of sprockets 168, 170. The chain 166 and sprockets 168, 170 reduce the rotational speed and increase the torque transmitted to the conveyor 120. When energized, the rotation actuator 162 is configured to control the movement of the conveyor 120 around the vertical axis 154 in the directions of arrows 42, 44. When energized, the tilt actuator 164 is configured to control the movement of the conveyor 120 around the horizontal axis 156 in the directions of arrows 46, 48. In this illustrative embodiment, the rotation actuator 162 is a hydraulic motor and the tilt actuator 164 is a hydraulic cylinder. In other embodiments, the actuators 162, 164 may be linear actuators, motors, or any other type of actuator configured to move the conveyor 120 as described herein.

Figure 4:
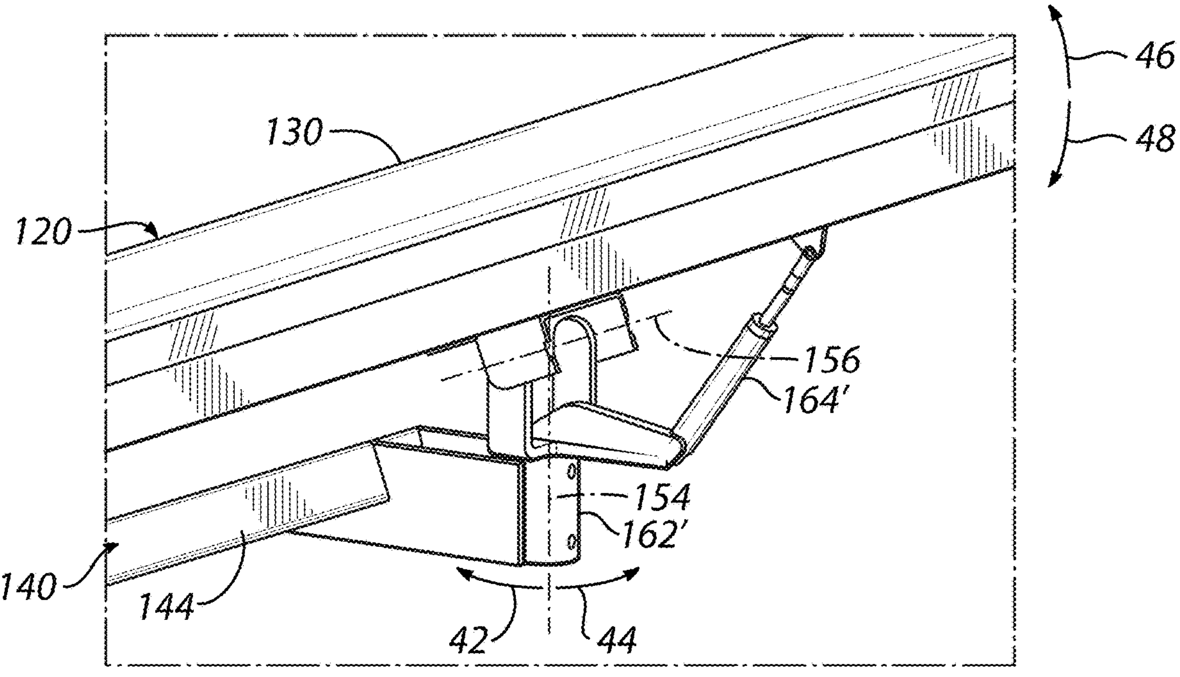
FIG. 4 is a perspective view of an alternative upper end portion of a support arm supporting the conveyor of a seed tender.

FIG. 4 is a perspective view of an alternative upper end portion 144' of a support arm 140' showing the conveyor 120 movably coupled to the support arm 140'. A rotation actuator 162' and a tilt actuator 164' are operatively coupled to the support arm 140' and the conveyor 120. Similar to the actuators 162, 164 shown in FIG. 3 and described above, the rotation actuator 162' is configured to control the movement of the conveyor 120 around the vertical axis 154 and the tilt actuator 164' is configured to control the movement of the conveyor 120 around the horizontal axis 156. In this illustrative embodiment, the rotation actuator 162' is a helical hydraulic rotary actuator and the tilt actuator 164' is a hydraulic cylinder. Helical hydraulic rotary actuators are generally capable of operating at lower speeds than hydraulic motors and have higher torque capabilities. Utilizing a helical hydraulic rotary actuator instead of a hydraulic motor eliminates the need for a chain and sprockets, belt and pulleys, or gears to couple the actuator to the driven device.

Referring to FIGS. 1-3, when the conveyor 120 is in an unload position, the rotation actuator 162 and/or the tilt actuator 164 may need to be in a "float mode" where the conveyor 120 is free to rotate about the vertical axis 154 and/or the horizontal axis 156 to prevent binding of the support arm 140. When in float mode, the actuators 162, 164 are not energized or locked, and therefore, will not move the conveyor 120 or prevent the conveyor 120 from moving. In the case of hydraulic actuators, the float mode will allow hydraulic fluid to freely pass in and out of the actuators 162, 164 allowing free movement of the actuator when a force is applied to the conveyor 120, for example. When the conveyor 120 in an unload position, where the hopper 122 of the conveyor 120 is positioned under the outlet 112 of the container 110, an operator may need to reposition the conveyor 120 in order to reach a receiving container, for example. The operator may control the movement of the conveyor 120 by selectively energizing the swing actuator 150 and/or the lift actuator 152. If the actuators 162, 164 are not in the float mode, the actuators 162, 164 may prevent the desired movement of the conveyor 120 and/or cause the seed tender 100 to be damaged. Similarly, in some embodiments, when the conveyor 120 is in an unload position, the rotation actuator 162' and/or the tilt actuator 164', see FIG. 4, may be placed in the float mode allowing the conveyor 120 to move freely around the vertical axis 154 and/or the horizontal axis 156.

Figure 5:
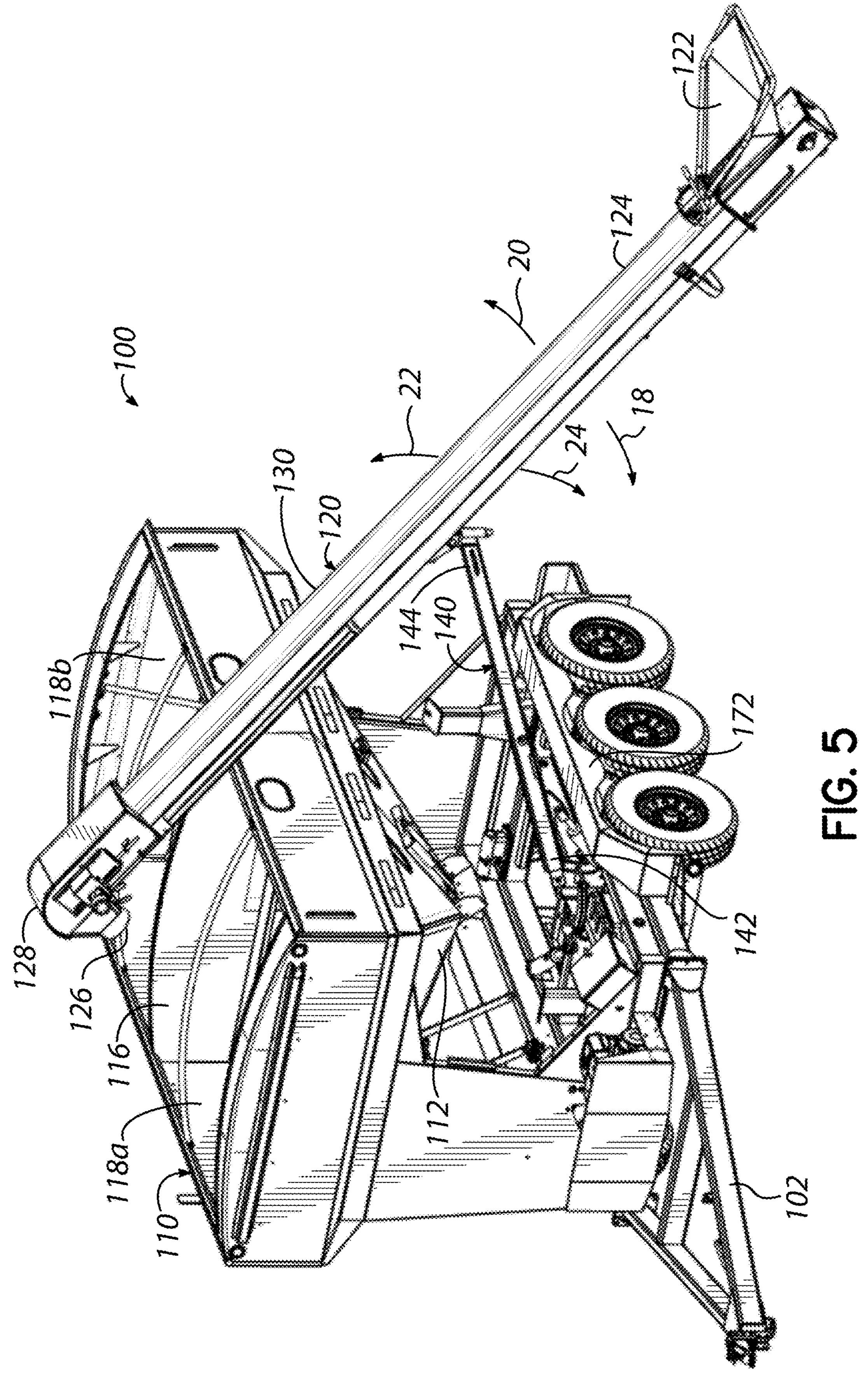
FIG. 5 is a perspective view of the seed tender of FIG. 1 with the conveyor in a loading or self-fill mode.

FIG. 5 is a perspective view of the illustrative seed tender 100 with the conveyor 120 in a loading or self-fill mode where the hopper 122 of the conveyor 120 is positioned to receive seed and the discharge spout 126 is positioned to discharge seed into the container 110. The seed is directed into the hopper 122 and the seed is carried by the conveyor 120 to the discharge spout 126 where the seed is discharged into the container 110. When the seed tender 100 is in the self-fill mode, or other configuration where the hopper 122 of the conveyor 120 is not positioned under the outlet 112 of the container 110, energizing the swing actuator 150 moves the support arm 140 around the vertical axis 146, see FIG. 2, thereby moving the upper end portion 144 and the conveyor 120 generally in an arc in the directions of arrows 18, 20. Additionally, when the seed tender 100 is in the self-fill mode, or other configuration where the hopper 122 of the conveyor 120 is not positioned under the outlet 112 of the container 110, energizing the lift actuator 152 moves the support arm 140 around the horizontal axis 148, see FIG. 2, thereby moving the upper end portion 144 and the conveyor 120 up and down in the directions of arrows 22, 24. Movement of the conveyor 120 may be controlled by an operator by entering command inputs into a controller, for example. An operator may enter a command input into a controller to energize the rotation actuator 162 to rotate the conveyor 120 around the vertical axis 154 to position the discharge spout 126 and/or the hopper 122, for example. An operator may enter a command input into a controller to energize the tilt actuator 164 to rotate the conveyor 120 around the horizontal axis 156 to raise the discharge spout 126 and lower the hopper 122 or lower the discharge spout 126 and raise the hopper 122, for example. In some embodiments, the tilt actuator 164 may be used to support the inlet end portion 124 above the ground eliminating the need for a support structure under the inlet end portion 124. In some embodiments, the hopper 122 is constructed of a flexible material and is configured to be raised and lowered to clear the outlet 112 of the container 110 when the conveyor 120 is moved from the unload position to the self-fill position, for example. The hopper 122 may include a hopper actuator configured to raise and lower the hopper 122.

Figure 6:
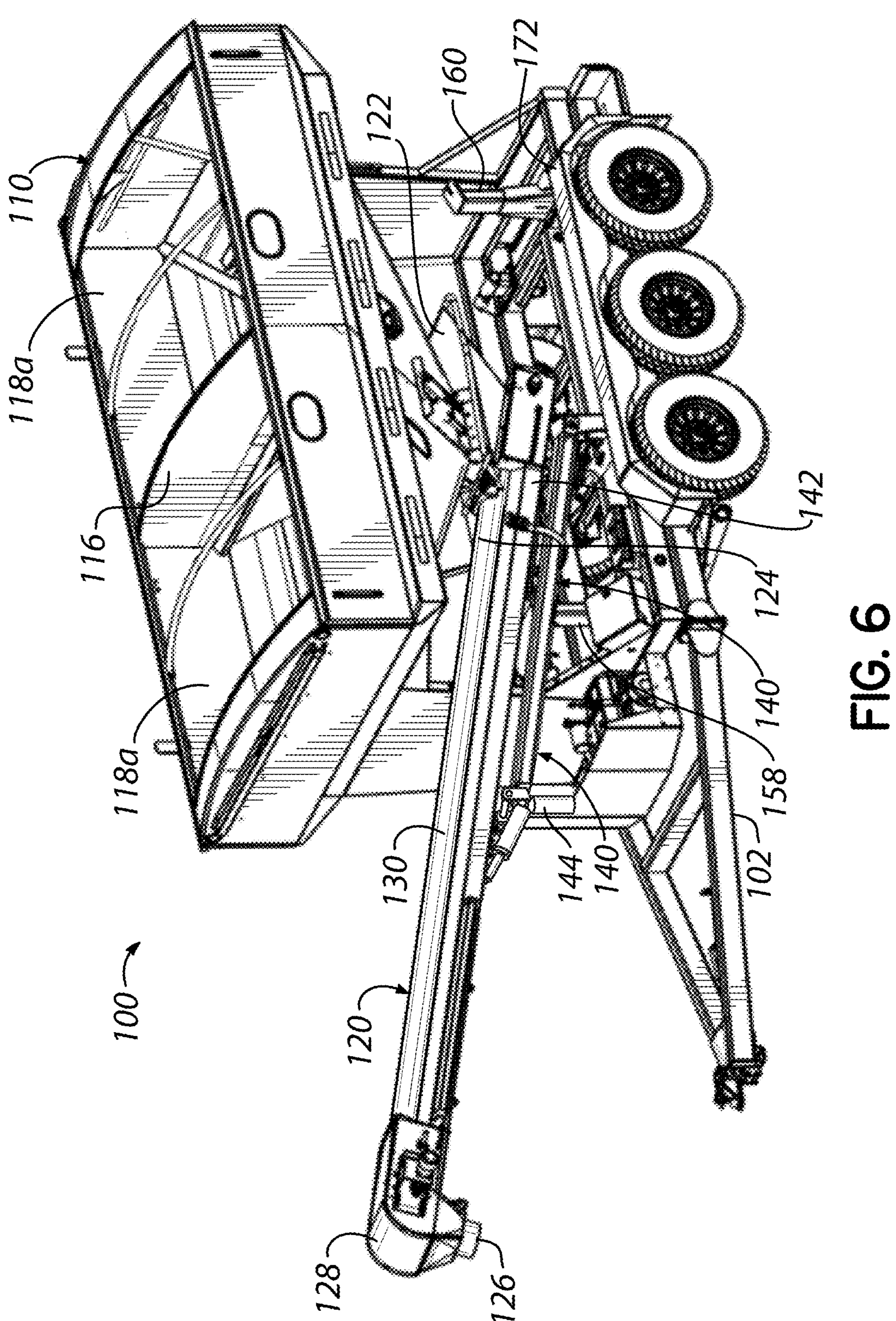
FIG. 6 is a perspective view of the seed tender of FIG. 1 with the conveyor in a stored or transport position.

FIG. 6 is a perspective view of the illustrative seed tender 100 with the conveyor 120 in a stored or transport position. The stored or transport configuration minimizes the width of the seed tender 100 for over the road movement and the overall footprint of the seed tender 100 for storage. The support arm 140 may rest on a front conveyor rest 158 as shown in FIG. 6, or a rear conveyor rest 160 thereby supporting the conveyor 120 for transport. The rests 158, 160 may include one or more latches or other devices to secure the conveyor 120 in the stored or transport position.

Methods of controlling the complex movement of the conveyor 120 involving multiple actuators are described herein. Referring to FIG. 1, controlling the movement of the conveyor 120 on the seed tender 100 may involve the operator entering multiple command inputs, such as activating buttons or switches, into a controller for example. For complex movement of the conveyor 120 involving multiple actuators, the command inputs must be entered in the correct sequence and for the correct durations to correctly position the conveyor 120 while avoiding obstacles such as the conveyor rests 158, 160, the container 110, and/or the fender 172. When in unload mode, the conveyor 120 rotates around the inlet end portion 124 of the conveyor 120 which is positioned under the outlet 112 of the container 110. When the inlet end portion 124 of the conveyor 120 is in an inclined orientation under the container 110, the top of the conveyor 120 may clear the container 110 when positioned perpendicular to the container 110 as shown if FIG. 1. However, since the general shape of the container 110 is rectangular, the top of the conveyor 120 may contact the front or rear corners of the container 110 as the outlet end portion 128 of the conveyor 120 is rotated forwards or backwards in the directions of arrows 10, 12. To clear the front or rear corners of the container 110 the outlet end portion 128 of the conveyor 120 may need to be lowered in the direction of arrow 16 by the operator. Additionally, the bottom of the conveyor 120 may clear the fenders 172 when positioned on an angle towards the front or the rear of the seed tender 100 but the conveyor 120 may contact the fender 172 when positioned perpendicular to the container 110 if the operator does not raise the outlet end portion 128 of the conveyor 120 in the direction of arrow 14.

Another challenging task requiring the complex movement of the conveyor 120 involves undocking of the conveyor 120 from one of the conveyor rests 158, 160 after transport, see FIG. 6. Undocking the conveyor 120 may include moving the conveyor 120 up to clear the rests 158, 160 while avoiding contacting the container 110 while also moving the conveyor 120 out of the transport position. An operator must also dock the conveyor 120 into one of the conveyor rests 158, 160 before transport. Docking the conveyor 120 may involve moving the conveyor 120 down to clear the container 110 while clearing the rests 158, 160 while also moving the conveyor 120 into the transport position. When moving the conveyor 120 into the transport position, an operator may accidentally overshoot the rests 158, 160 requiring the operator to reverse the movement of the conveyor 120.

Positioning the conveyor 120 in and out of self-fill mode also involves the complex movement of the conveyor 120 and includes multiple operator inputs, see FIG. 5. The operator may need to undock the conveyor 120 from the front or rear rest 158, 168. The operator needs to position the conveyor 120 at about a 45° angle to relative to the front or rear of the container 110. The operator may need to uncouple the inlet end portion 124 of the conveyor 120 to allow the inlet end portion 124 to swing out from under the container 110. Once uncoupled, the inlet end portion 124 needs to be raised above the fender 172 and other components of the seed tender 100 and moved out from under the container 110. Next, the conveyor 120 needs to be positioned so the outlet end portion 128 of the conveyor 120 is positioned above the front or rear hopper 118*a*, 118*b* which the operator wishes to dispense seed into.

In this illustrative embodiment, the seed tender 100 includes a sensor system that may include one or more sensors and/or switches capable of detecting the position on the conveyor 120 and/or the support arm 140. Additionally, the sensor system may include one or more sensors capable of detecting the container 110, fender 172, and/or the conveyor rests 158, 160 as well as other components of the seed tender 100. The sensor system may also include one or more sensors capable of detecting other obstacles such as personnel and other pieces of equipment that the conveyor 120 and/or the support arm 140 may encounter when the conveyor 120 is moving. The sensor system may be part of a control system and may send signals to a controller. The control system may prevent an operator from moving the conveyor 120 in a direction and/or into a position that would cause the conveyor 120 and/or the support arm 140 to contact components of the seed tender 100, personnel, or another object. In some embodiments, one or more of the actuators 150, 152, 162, 164 may be feedback actuators where the actuator includes one or more position sensors and/or switches configured to detect the position of the actuator. Feedback actuators may include sensors such as potentiometers, hall sensors, or optical feedback sensors, for example. Feedback actuators enable enhanced control capabilities and superior resolution for applications that require positional control, tracking, or syncing. In some embodiments, the feedback actuators may be hydraulic cylinders having a hall sensor, extending within the cylinder rod of the hydraulic cylinder, and a magnet located outside of the cylinder rod. As the cylinder rod moves within the hydraulic cylinder, the hall sensor detects the magnet and outputs a signal indicating the position of the cylinder rod. The sensors and/or switches of a feedback actuator may send signals to a controller. The sensors and/or switches of a feedback actuator may be used to set position limits to prevent the conveyor 120 and/or the support arm 140 from contacting components of the seed tender 100 such as the container 110, fender 172, and/or the conveyor rests 158, 160.

Figure 7:
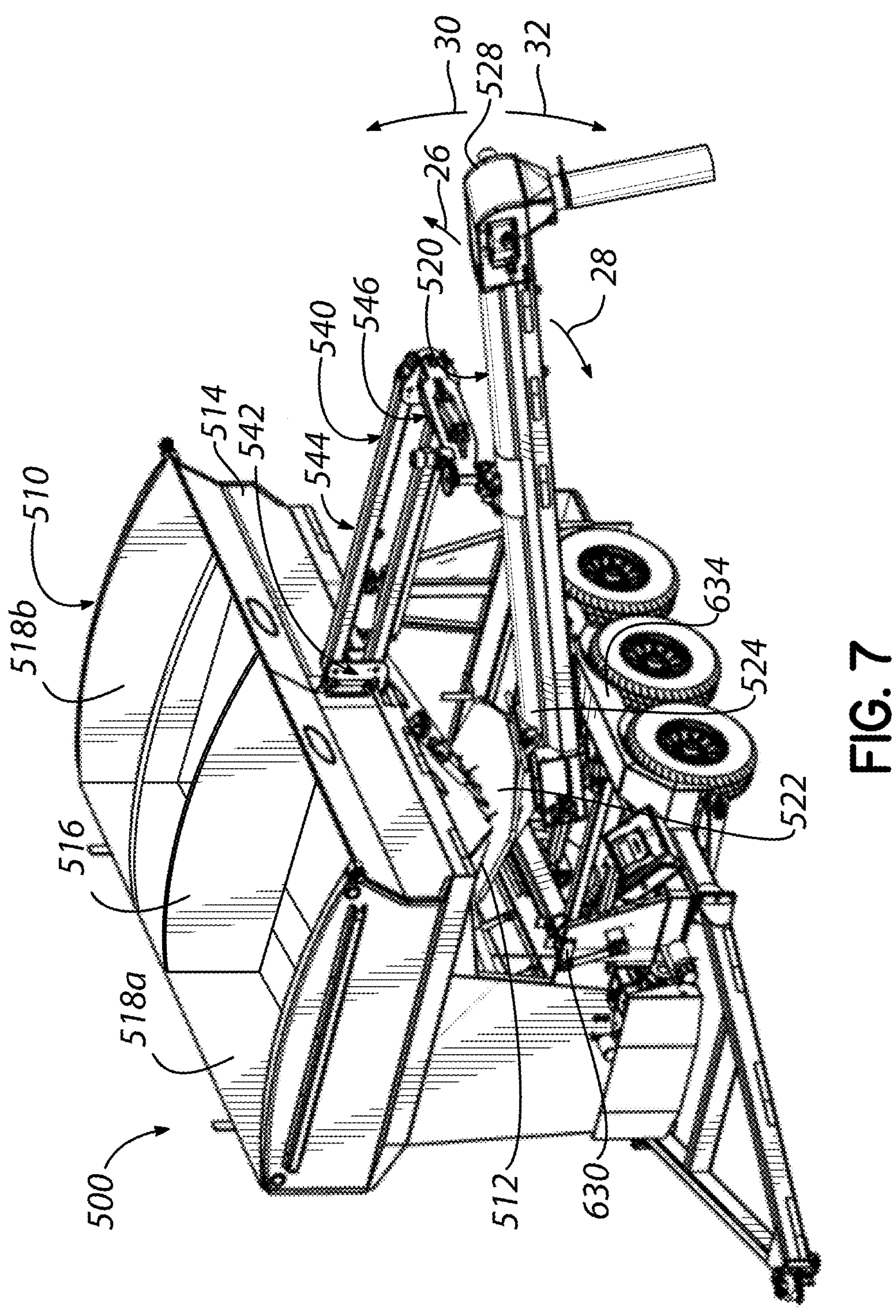
FIG. 7 is a perspective view of an alternative seed tender with a conveyor in an unload position.

FIG. 7 is a perspective view of an alternative illustrative seed tender 500 where a conveyor 520 is in an unload position to unload seed from a container 510, such as a seed tank, into a receiving container, such as a seed bin of a planter, for example. The container 510 includes a dividing wall 516 separating front and rear hoppers 518*a*, 518*b*. A hopper 522 of an inlet end portion 524 of the conveyor 520 positioned under an outlet 512 of the container 510 when the conveyor 520 is in the unload configuration, such as the unload position shown in FIG. 7. It should be understood the conveyor 520 may be placed in any number of unload positions depending on the location and orientation of the seed tender 500 relative to the location and orientation of a receiving container, such as a seed bin of a planter, for example. Seed is discharged from the front and/or rear hopper 518*a*, 518*b* through the outlet 512 of the container

510 into the hopper 522 of the conveyor 520 and the seed is carried by the conveyor 520 to a discharge spout 526 at an outlet end portion 528 of the conveyor 520 where the seed is discharged. Additional details of the construction and operation of seed tenders may be found in U.S. Pat. No. 10,150,400 incorporated herein by reference.

Figure 7A:
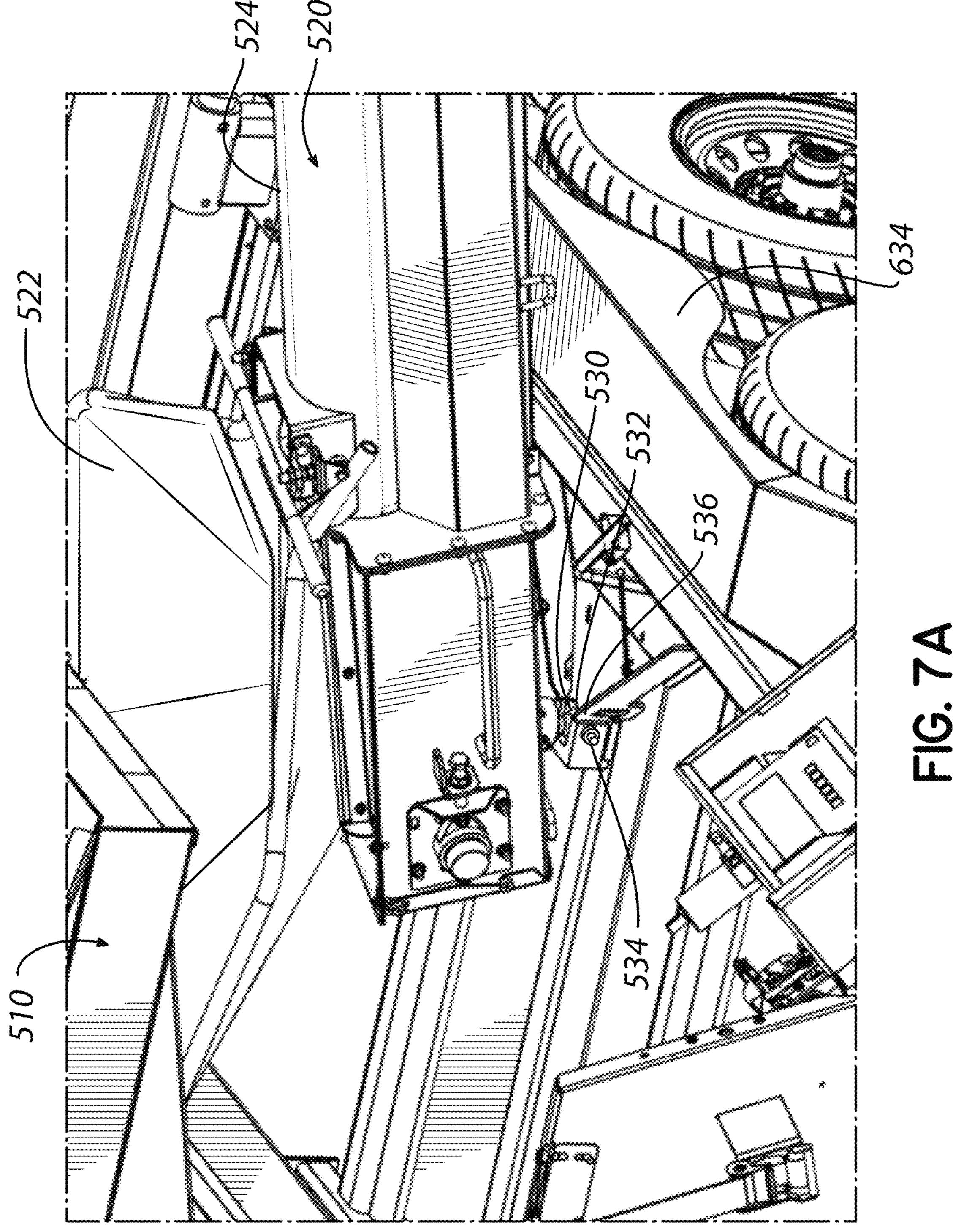
FIG. 7A is a detailed view of an inlet end portion of the conveyor of FIG. 7.

FIG. 7A is a detailed view of the inlet end portion 524 of the conveyor 520 in the unload configuration. The inlet end portion 524 of the conveyor 520 includes a ball 530 configured to engage a socket 532 when the conveyor 520 is in the unload configuration. In this illustrative embodiment, a sensor or switch 534 is located near the socket 532 and is configured to detect when the conveyor 520 is in the unloading position. In some embodiments, the sensor or switch 534 may be a proximity sensor. The socket 532 may include a latch 536 configured to secure the ball 530 in the socket 532 when the conveyor 520 is in the unload configuration.

Figure 8:
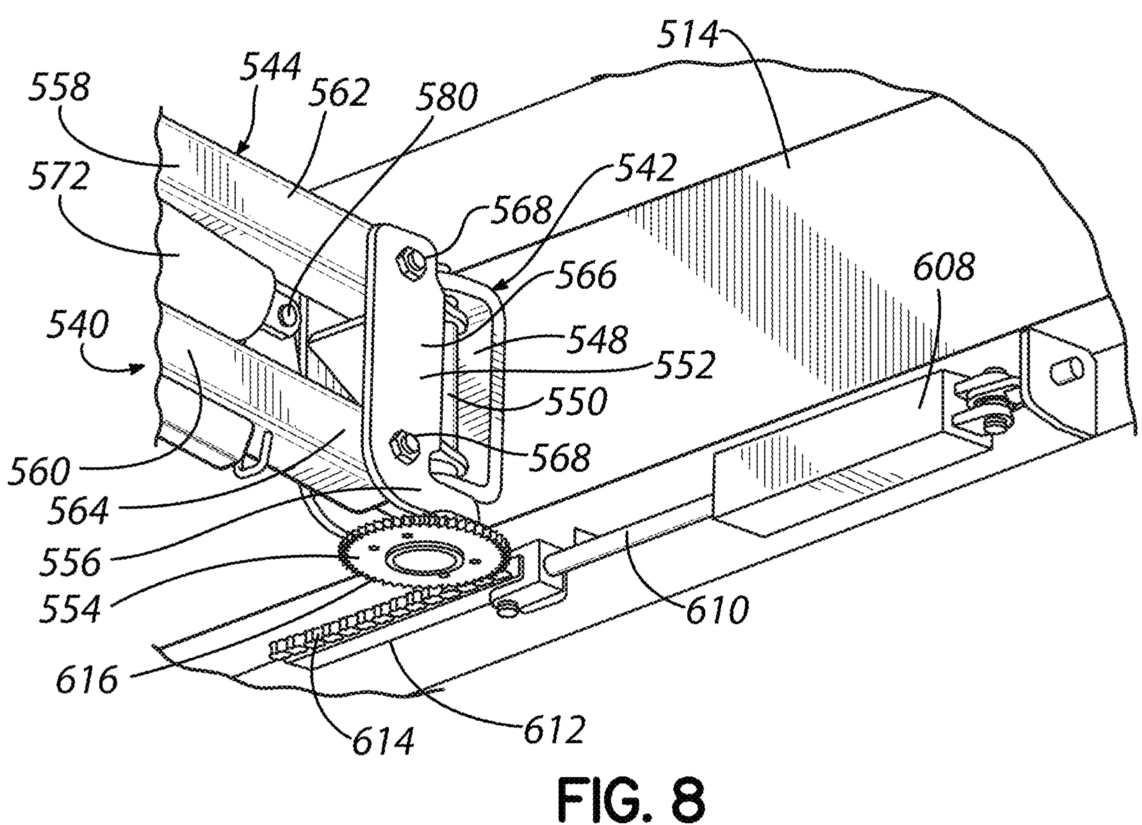
FIG. 8 is a detailed perspective view of a portion of the articulated support arm of the seed tender of FIG. 7.
Figure 9:
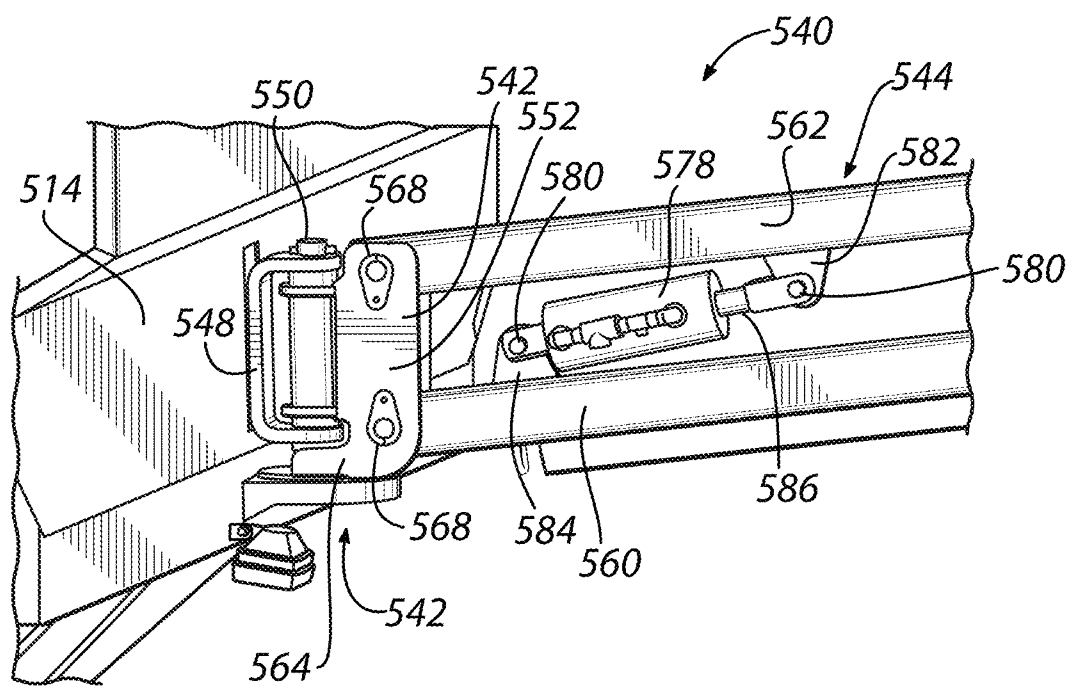
FIG. 9 is an alternative detailed perspective view of a portion of the articulated support arm of the seed tender of FIG. 7.
Figure 10:
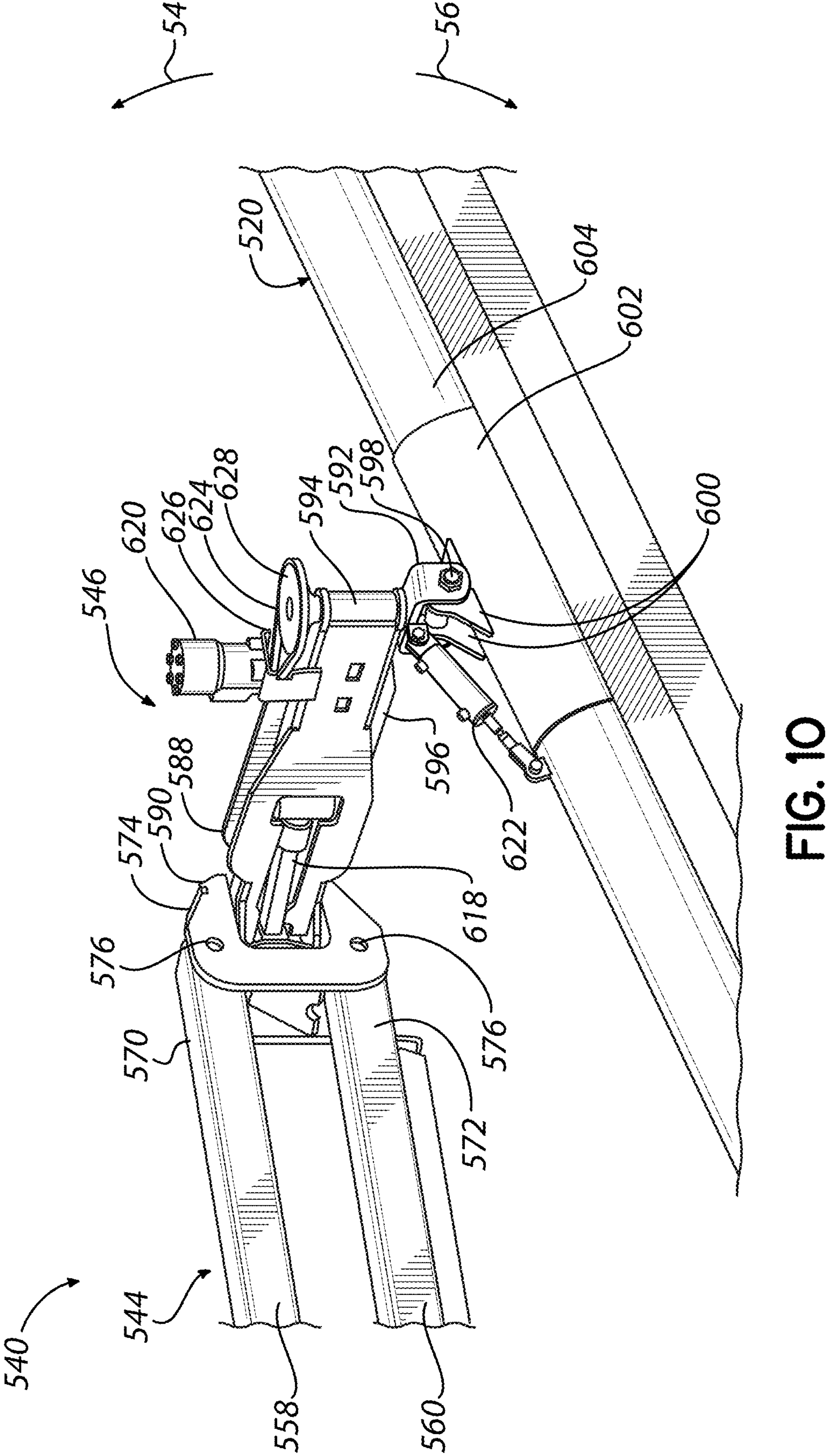
FIG. 10 is a detailed perspective view of a portion of the articulated support arm of the seed tender of FIG. 7.

FIGS. 8-10 are detailed perspective views of an articulated support arm 540. Referring to FIGS. 7, 8, and 9, the seed tender 500 includes an articulated support arm 540 located above the conveyor 520 and configured to support the conveyor 520 from the side 514 of the container 510. The articulated support arm 540 includes a support bracket assembly 542, an inner support arm or lift arm assembly 544, and an outer support arm or swivel arm 546. The support bracket assembly 544 includes a fixed bracket 548 secured to the upper left side wall 514 of the container 510 and generally aligned with the dividing wall 516 separating the front and rear hoppers 518*a*, 518*b*. A vertical pin or shaft 550 rotatably couples a rotating bracket 552 to the fixed bracket 548. A sprocket 554 is coupled to a bottom portion 556 of the rotating bracket 552.

Referring to FIGS. 8-10, the lift arm assembly 544 includes parallel spaced upper and lower support arms 558, 560 having respective inner end portions 562, 564, pivotally connected to a U-shaped portion 566 of the rotating bracket 552 by a pair of pivot pins or bolts 568. The support arms 558, 560 have outer end portions 570, 572 pivotally connected to a C-shaped end bracket 574 by a pair of pivot pins or bolts 576. A lift actuator 578, such as a hydraulic actuator or hydraulic cylinder for example, is pivotally connected with pins or bolts 580 to a flange 582 coupled to the upper support arm 558 and a flange 584 connected to the lower support arm 560. The lift actuator 578 is operatively coupled to the conveyor 520 as further described herein. The lift actuator 578 is described herein as a hydraulic cylinder but may be other types of actuators such as a linear actuator, for example. The parallel support arms 558, 560 are configured for vertical rotational movement around the pivot pins or bolts 568 in a vertical plane. The support arms 558, 560 remain substantially parallel as they pivot on the pivot pins or bolts 568, 576. Extension of the rod 586 of the lift actuator 578 moves the outer end portions 570, 572 of the support arms 558, 560 and the end bracket 574 vertically upward. Retraction of the rod 586 of the lift actuator 578 moves the outer end portions 570, 572 of the support arms 558, 560 and the end bracket 574 vertically downward. Due to the parallel movement of the support arms 558, 560, the orientation of the end bracket 574 is maintained while the end bracket 574 moves up and down. Energizing the lift actuator 578 while the hopper 522 of the conveyor 520 is positioned under the outlet 512 of the container 510 raises and lowers the outlet end portion 528 of the conveyor 520 generally in the directions of arrows 30, 32, see FIG. 7.

The swivel arm 546 has an inner end portion 588 movably connected to the end bracket 574 by a vertical pin or shaft 590. The swivel arm 546 is configured to rotate or swing in a horizontal plane around the central axis of the pin or shaft 590. A U-shaped bracket or clevis 592 is supported by a shaft 594 from the outer end portion 596 of the swivel arm 546. The clevis 592 is connected by a pin 598 to a pair of flanges 600 secured to a curved reinforcing plate 602 attached to the tubular housing 604 of the conveyor 520. Flanges 600 are generally located at the center of mass of conveyor 520. The conveyor 520 is suspended from the swivel arm 546 and is configured to rotate around the central axis of the shaft 594 in the directions of arrows 50, 52 and the central axis of the pin 598 in the directions of arrows 54, 56.

Referring again to FIGS. 8-10, the lift arm assembly 544 of the articulated support arm 540 is configured for horizontal rotational movement around the central axis of the shaft 550. The lift arm assembly 544 is rotated by a swing actuator 608, such as a hydraulic actuator or hydraulic cylinder for example. The swing actuator 608 is operatively coupled to the conveyor 520 as further described herein. The swing actuator 608 is described herein as a hydraulic cylinder but may be other types of actuators such as a linear actuator or motor, for example. The swing actuator 608 has a rod 610 connected to an elongated rack 612 having teeth 614 which engage the teeth 616 of the sprocket 554. Energizing the swing actuator 608 rotates the sprocket 554 which rotates the lift arm assembly 544 around the central axis of the shaft 550. Energizing the swing actuator 608 while the hopper 522 of the conveyor 520 is positioned under the outlet 512 of the container 510 moves the outlet end portion 528 of the conveyor 520 generally in an arc in the directions of arrows 26, 28, see FIG. 7.

Figure 10A:
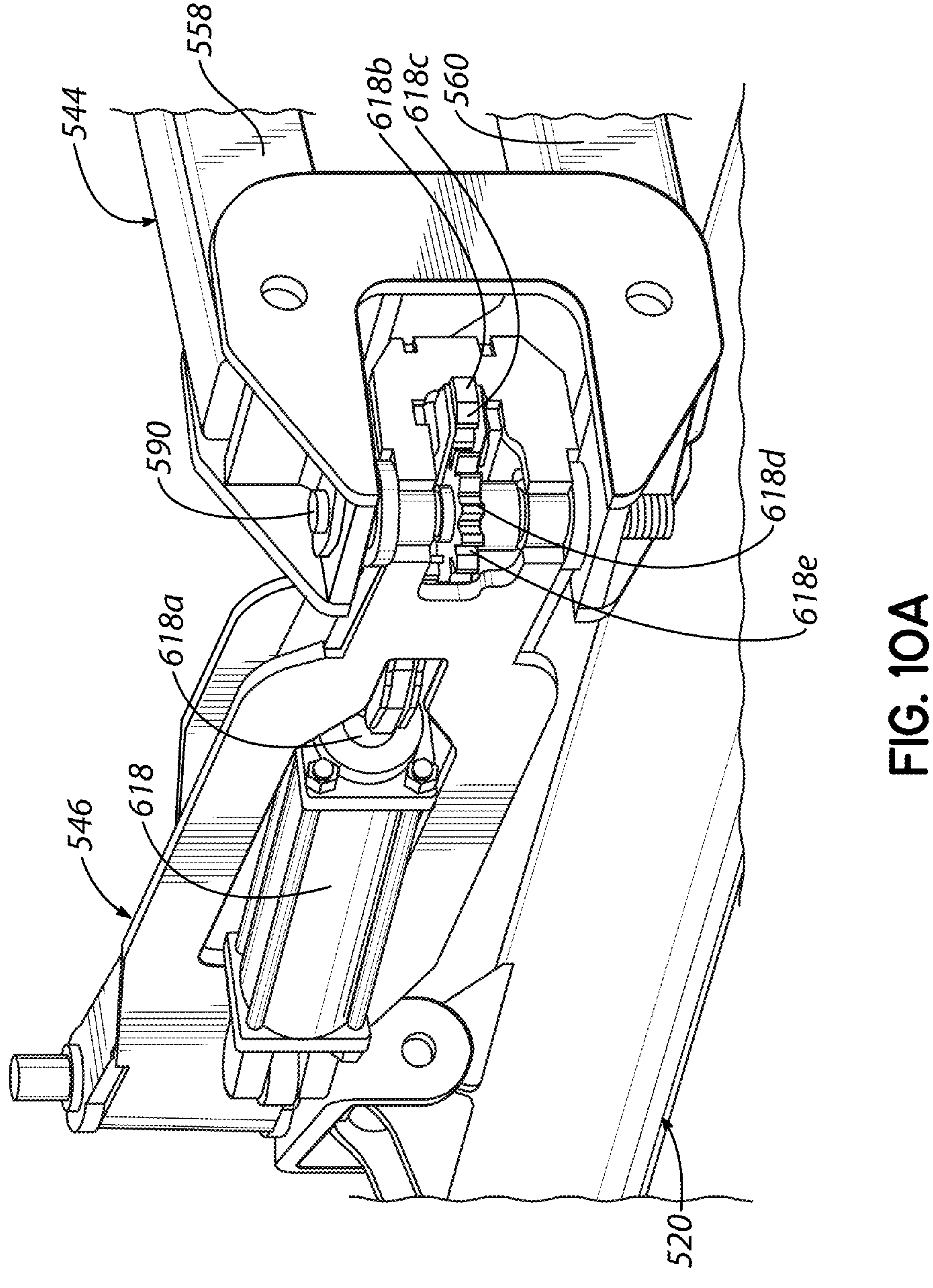
FIG. 10A is an alternative detailed perspective view of a portion of the articulated support arm of the seed tender of FIG. 7.
Figure 10B:
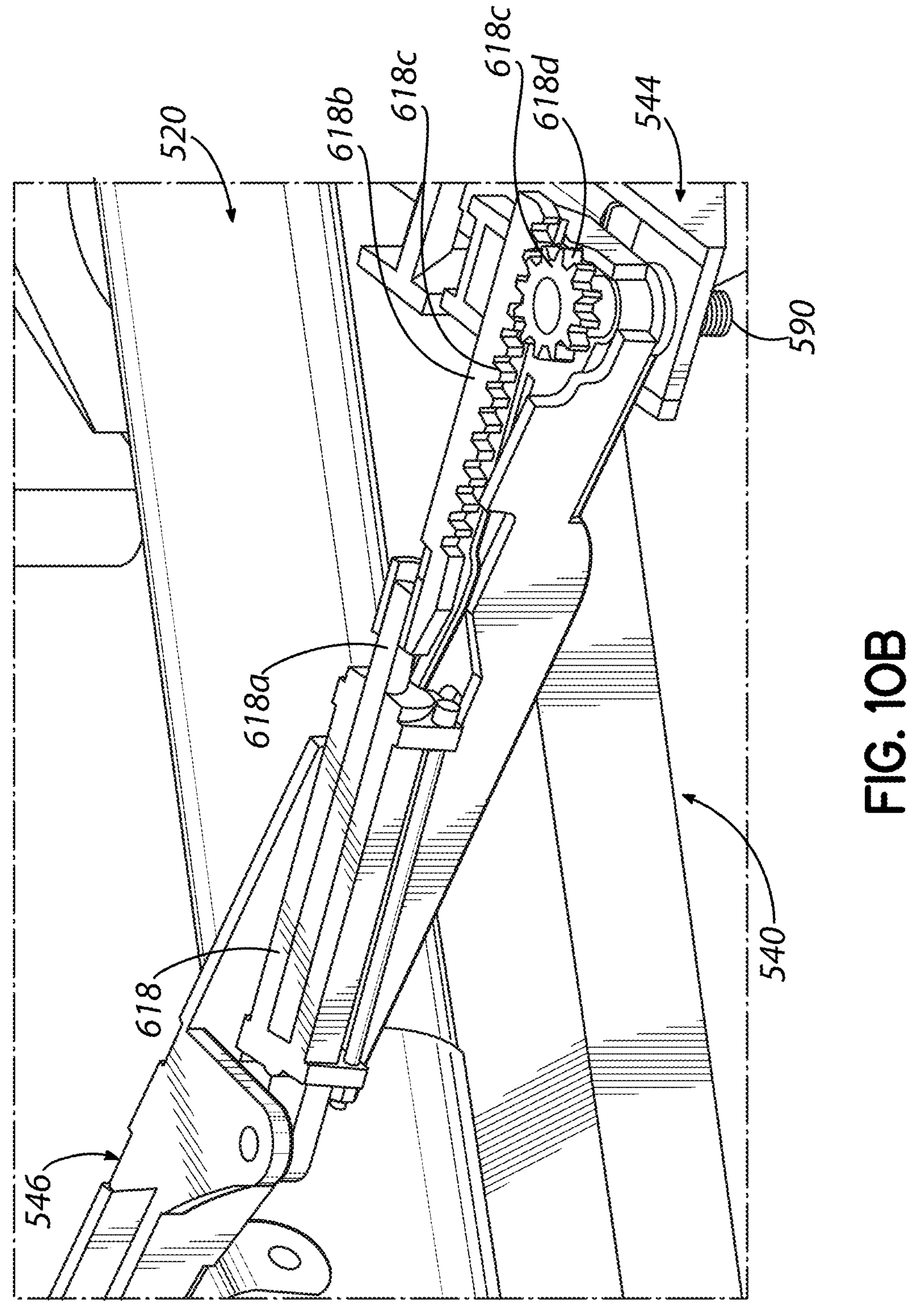
FIG. 10B is a section view of a portion of the articulated support arm of the seed tender of FIG. 7.

The swivel arm 546 of the articulated support arm 540 is configured for horizontal rotational movement around the central axis of the shaft 590. The swivel arm 546 is rotated by a swivel arm actuator 618, such as a hydraulic actuator or hydraulic cylinder for example. FIG. 10A is a perspective view of a portion of the articulated support arm 540 and FIG. 10B is a section view of a portion of the articulated support arm 540. In this illustrative embodiment, the swivel arm actuator 618 includes a rod 618*a* connected to an elongated rack 618*b* having teeth 618*c* which engage the teeth 618*d* of the sprocket 618*e*. The swivel arm actuator 618 is operatively coupled to the conveyor 520 as further described herein. Energizing the swivel arm actuator 618 rotates the sprocket 618*e* which rotates the swivel arm 546 around the central axis of the shaft 590. The swivel arm actuator 618 is described herein as a hydraulic cylinder but may be other types of actuators such as a linear actuator or a motor, for example. While the hopper 522 of the conveyor 520 is positioned under the outlet 512 of the container 510, such as when the conveyor 520 is positioned for unloading for example, the swivel arm actuator 618 must be in a float mode to prevent binding of the articulated support arm 540. When in float mode, the swivel arm 546 is free to rotate about the central axis of the shaft 590. When in float mode, the actuator 618 is not energized or locked, and therefore, will not move the swivel arm 546 or prevent the swivel arm 546 from moving. In the case of hydraulic actuators, the float mode will allow hydraulic fluid to freely pass in and out of the actuator allowing free movement of the actuator when a force is applied. Referring to FIG. 7A, when the conveyor 520 is in the unloading position with the ball 530 secured in the socket 532, the sensor or switch 534 sends a signal to a control system and the control system puts the swivel arm actuator 618 into a float mode in response to the signal from the sensor or switch 534. In some embodiments, the sensor or switch 534 may complete or break an electric circuit when the ball 530 is secured in the socket 532.

Referring to FIG. 10, a rotation actuator 620 and a tilt actuator 622 are operatively coupled to the swivel arm 546 and the conveyor 520. In this illustrative embodiment, the rotation actuator 620 is mounted the swivel arm 546 and is coupled the conveyor 520 with a chain 624 and a pair of sprockets 626, 628. The chain 624 and sprockets 626, 628 reduce the rotational speed and increase the torque transmitted to the conveyor 520. When energized, the rotation actuator 620 is configured to control the movement of the conveyor 520 around the central axis of the shaft 594. When energized, the tilt actuator 622 is configured to control the movement of the conveyor 520 around the central axis of the pin 598. In this illustrative embodiment, the rotation actuator 620 is a hydraulic motor and the tilt actuator 622 is a hydraulic cylinder. In other embodiments, the actuators 620, 622 may be linear actuators, motors, or any other type of actuator configured to move the conveyor 520 as described herein. While the hopper 522 of the conveyor 520 is positioned under the outlet 512 of the container 510, see FIGS. 7 and 7A, the rotation actuator 620 and the tilt actuator 622 must be in a float mode where the conveyor 520 is free to rotate about the central axis of the shaft 594 and the central axis of the pin 598 to prevent binding of the articulated support arm 540. When in float mode, the conveyor 520 is free to rotate about the central axis of the shaft 594 and the central axis of the pin 598. When in float mode, the actuator 618 is not energized or locked, and therefore, will not move the swivel arm 546 or prevent the swivel arm 546 from moving.

Movement of the articulated support arm 540, and thereby the conveyor 520, may be controlled by an operator by entering command inputs, such as by activating buttons or switches, into a controller for example. An operator may enter a command input into a controller to energize the swing actuator 608 to move the discharge spout 526 in the directions of arrows 26, 28, for example. An operator may enter a command input into a controller to energize the lift actuator 578 to raise and lower the discharge spout 526 in the directions of arrows 30, 62, for example.

Figure 11:
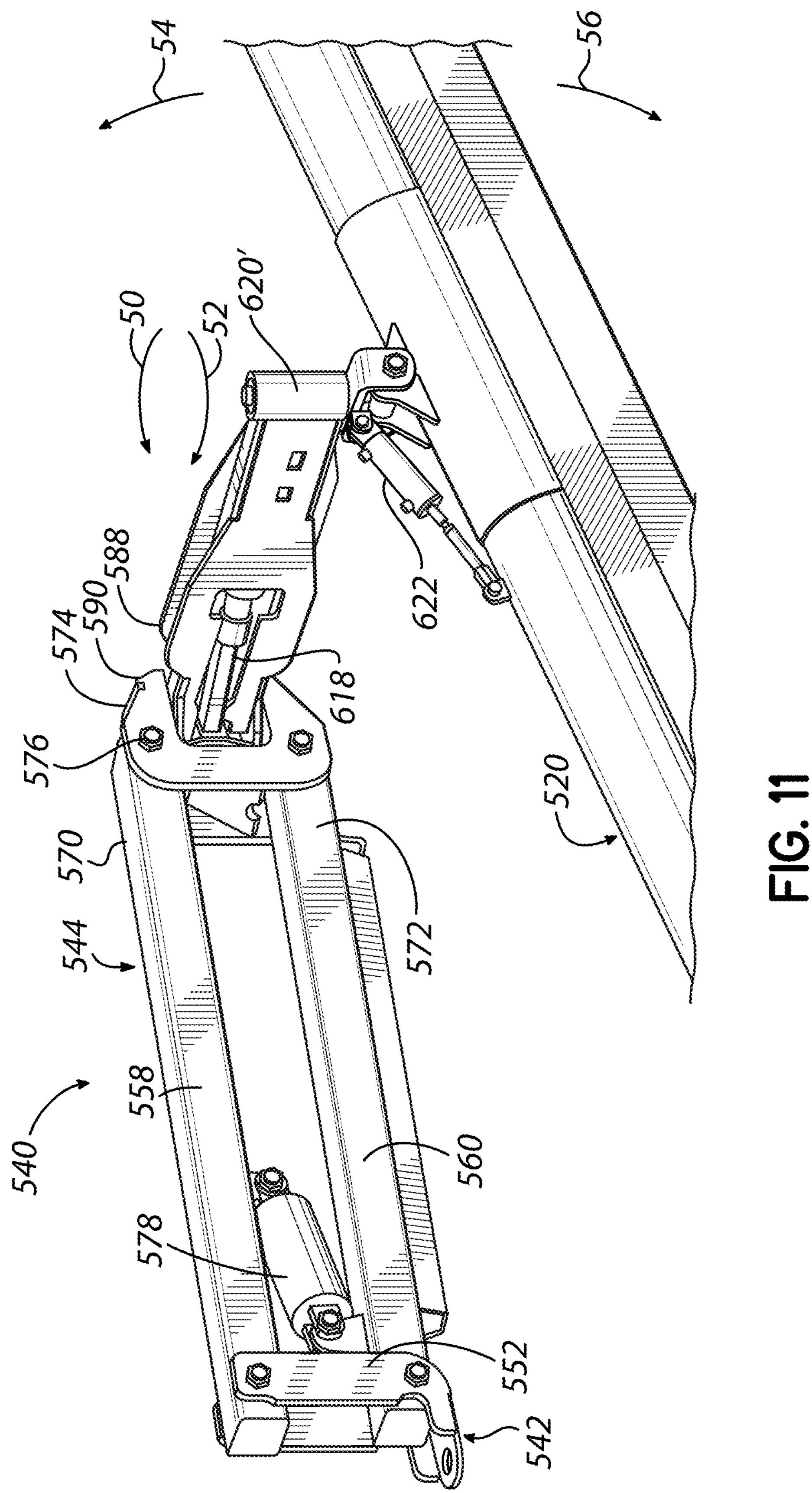
FIG. 11 is a detailed perspective view of an alternative articulated support arm.

FIG. 11 is a detailed perspective view of an alternative swivel arm 546' and the conveyor 520 with an alternative rotation actuator 620'. In this illustrative embodiment, the rotation actuator 620' is mounted the swivel arm 546' and is coupled the conveyor 520. The alternative swivel arm 546' and rotation actuator 620' function similarly to the swivel arm 546 and rotation actuator 620 described above. When energized, the rotation actuator 620' is configured to control the movement of the conveyor 520 around the central axis of the rotation actuator 620'. In this illustrative embodiment, the rotation actuator 620' is a helical hydraulic rotary actuator. Helical hydraulic rotary actuators are generally capable of operating at lower speeds than hydraulic motors and have higher torque capabilities. Utilizing a helical hydraulic rotary actuator instead of a hydraulic motor eliminates the need for a chain and sprockets, belt and pulleys, or gears to couple the actuator to the driven device.

Figure 12:
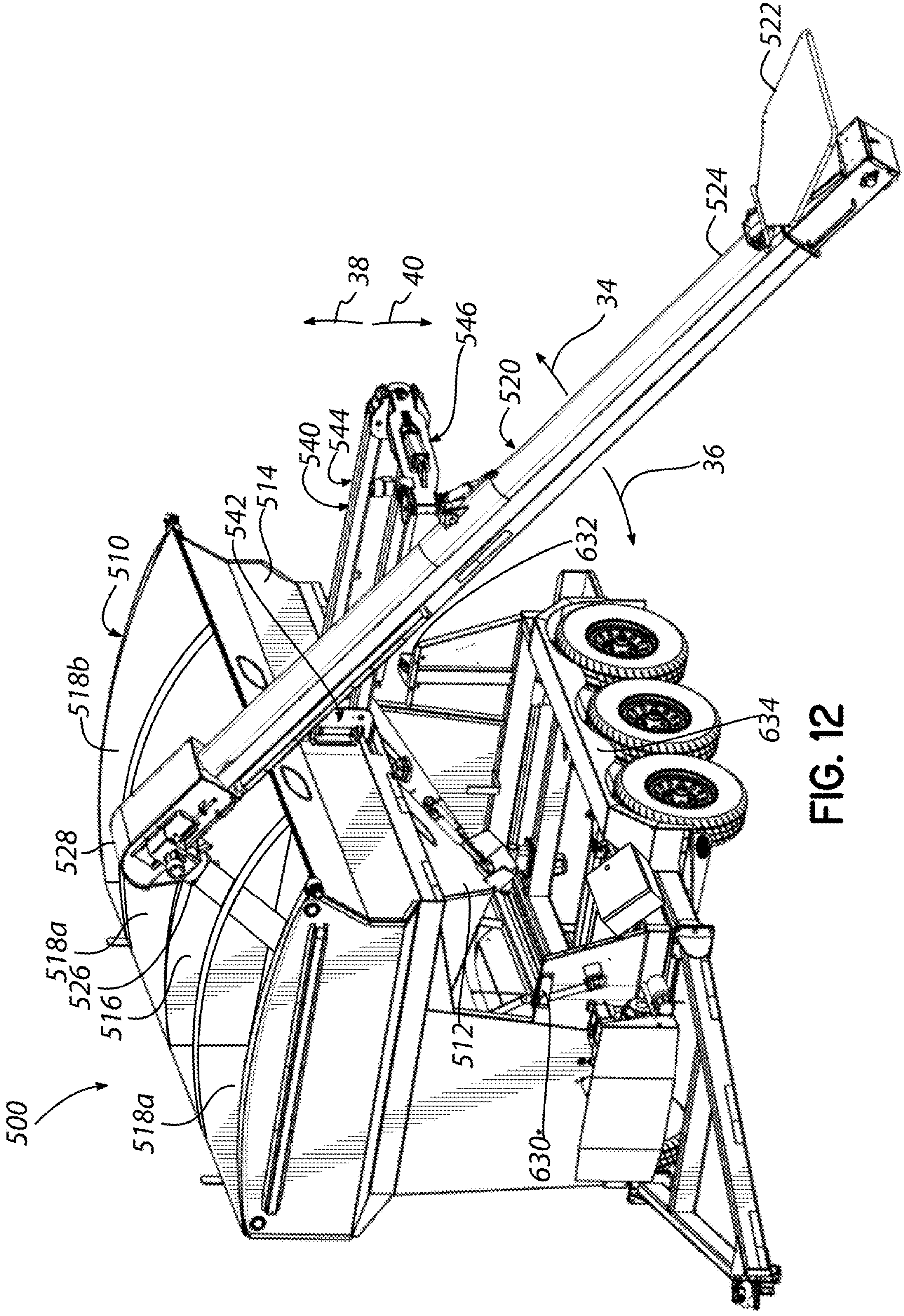
FIG. 12 is a perspective view of the seed tender of FIG. 7 with the conveyor in a self-fill position.

FIG. 12 is a perspective view of the illustrative seed tender 500 with the conveyor 520 in a self-fill mode where the hopper 522 of the conveyor 520 is positioned to receive seed and the discharge spout 526 is positioned to discharge seed into the container 510. The seed is directed into the hopper 522 and the seed is carried by the conveyor 520 to the discharge spout 526 where the seed is discharged into the container 510. When the seed tender 500 is in the self-fill mode, or other configuration where the hopper 522 of the conveyor 520 is not positioned under the outlet 512 of the container 510, energizing the swing actuator 608 moves the articulated support arm 540 around the central axis of the shaft 550, see FIGS. 8 and 9, thereby moving the conveyor 520 generally in an arc in the directions of arrows 34, 36. Additionally, when the hopper 522 of the conveyor 520 is not positioned under the outlet 512 of the container 510, energizing the lift actuator 578 moves the lift arm assembly 544 thereby raising and lowering the conveyor 520 in the directions of arrows 38, 40. When the hopper 522 of the conveyor 520 is not positioned under the outlet 512 of the container 510, energizing the swivel arm actuator 618 rotates the swivel arm 546 of the articulated support arm 540 around the central axis of the shaft 590, see FIG. 10. The swivel arm actuator 618 may be used to help position the conveyor 520. When the hopper 522 of the conveyor 520 is not positioned under the outlet 512 of the container 510, energizing the rotation actuator 620 rotates the conveyor 520 around the central axis of the shaft 594, see FIG. 10, and energizing the tilt actuator 622 rotates the conveyor 520 around the central axis of the pin 598. The rotation actuator 620 and the tilt actuator 622 may be used to help position the conveyor 520. In some embodiments, the hopper 522 is constructed of a flexible material and is configured to be raised and lowered to clear the outlet 512 of the container 510 when the conveyor 520 is moved from the unload position the self-fill position, for example. The hopper 522 may include a hopper actuator configured to raise and lower the hopper 522.

Movement of the conveyor 520 may be controlled by an operator by entering command inputs into a controller, for example. An operator may enter a command input into a controller to energize the swivel arm actuator 618 to rotate the swivel arm 546 around the central axis of the shaft 590 thereby moving the conveyor 520 to position the discharge spout 526 and/or the hopper 522, for example. An operator may enter a command input into a controller to energize the rotation actuator 620 to rotate the conveyor 520 around the central axis of the shaft 594 to position the discharge spout 526 and/or the hopper 522, for example. An operator may enter a command input into a controller to energize the tilt actuator 622 to rotate the conveyor 520 around the central axis of the pin 598 to raise the discharge spout 526 and lower the hopper 522 or lower the discharge spout 526 and raise the hopper 522, for example. In some embodiments, the tilt actuator 622 may be used to support the inlet end portion 524 above the ground eliminating the need for a support structure under the inlet end portion 524.

Figure 13:
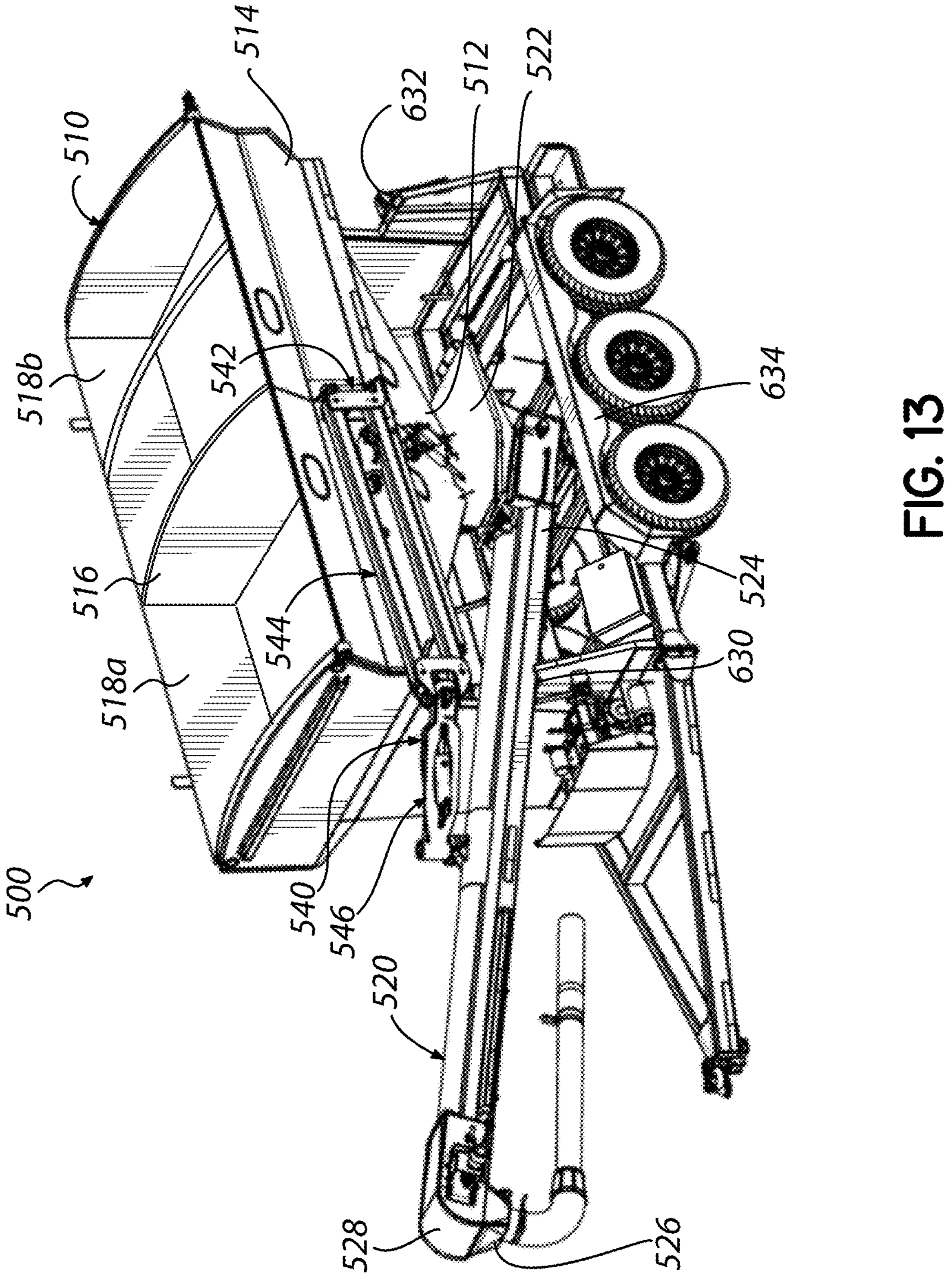
FIG. 13 is a perspective view of the seed tender of FIG. 7 with the conveyor in a stored or transport position.

FIG. 13 is a perspective view of the illustrative seed tender 500 with the conveyor 520 in a stored or transport position. The stored or transport configuration minimizes the width of the seed tender 500 for over the road movement and the overall footprint of the seed tender 500 for storage. The conveyor 520 may rest on a front conveyor rest 630 as shown in FIG. 13, or a rear conveyor rest 632, thereby supporting the conveyor 520 for transport. The rests 630, 632 may include one or more latches or other devices to secure the conveyor 520 in the stored or transport position.

Methods of controlling the complex movement of the conveyor 520 involving multiple actuators are described herein. Referring to FIG. 7, controlling the movement of the conveyor 520 on a seed tender 500 may involve the operator entering multiple command inputs, such as activating buttons or switches, into a controller for example. For complex movement of the conveyor 520 involving multiple actuators, the command inputs must be entered in the correct sequence and for the correct durations to correctly position the conveyor 520 while avoiding obstacles such as the conveyor rests 630, 632, the container 510, and/or the fender 634. When in unload mode, the conveyor 520 rotates around the inlet end portion 524 of the conveyor 520 which is positioned under the outlet 512 of the container 510. When the inlet end portion 524 of the conveyor 520 is in an inclined orientation under the container 510 the top of the conveyor 520 may clear the container 510 when positioned perpendicular to the container 510, as shown if FIG. 7. However, since the general shape of the container 510 is rectangular, the top of the conveyor 520 may contact the front or rear corners of the container 510 as the outlet end portion 528 of the conveyor 520 is rotated forwards or backwards in the directions of arrows 26, 28. To clear the front or rear corners of the container 510 the outlet end portion 528 of the conveyor 520 may need to be lowered in the direction of arrow 32 by the operator. Additionally, the bottom of the conveyor 520 may clear the fender 634 when positioned on an angle towards the front or the rear of the seed tender 500, but the conveyor 520 may contact the fender 634 when positioned perpendicular to the container 510 if the operator does not raise the outlet end portion 528 of the conveyor 520 in the direction of arrow 30.

Another challenging task requiring the complex movement of the conveyor 520 involves undocking of the conveyor 520 from one of the conveyor rests 630, 632 after transport, see FIG. 13. Undocking the conveyor 520 may include moving the conveyor 520 up to clear the rests 630, 632 while avoiding contacting the container 510 while also moving the conveyor 520 out of the transport position. An operator must also dock the conveyor 520 into one of the conveyor rests 630, 632 before transport. Docking the conveyor 520 may involve moving the conveyor 520 down to clear the container 510 while clearing the rests 630, 632 while also moving the conveyor 520 into the transport position. When moving the conveyor 520 into the transport position, an operator may accidentally overshoot the rests 630, 632 requiring the operator to reverse the movement of the conveyor 520.

Positioning the conveyor 520 in and out of self-fill mode also involves the complex movement of the conveyor 520 and includes multiple operator inputs, see FIG. 12. The operator may need to undock the conveyor 520 from the front or rear rest 630, 632. The operator needs to position the conveyor 520 at about a 45° angle to relative to the front or rear of the container 510. The operator may need to uncouple the inlet end portion 524 of the conveyor 520 to allow the inlet end portion 524 to swing out from under the container 510. Once uncoupled, the inlet end portion 524 needs to be raised above the fender 634 and other components of the seed tender 500 and moved out from under the container 510. Next, the conveyor 520 needs to be positioned so the outlet end portion 528 of the conveyor 520 is positioned above the front or rear hopper 518*a*, 518*b* which the operator wishes to dispense seed into.

In this illustrative embodiment, the seed tender 500 includes a sensor system that may include one or more sensors and/or switches capable of detecting the position on the conveyor 520 and/or the articulated support arm 540. Additionally, the sensor system may include one or more sensors capable of detecting the container 510, fender 634, and/or the conveyor rests 630, 632 as well as other components of the seed tender 500. The sensor system may also include one or more sensors capable of detecting other obstacles such as personnel and other pieces of equipment that the conveyor 520 and/or the articulated support arm 540 may encounter when the conveyor 520 is moving. The sensor system may be part of a control system and may send signals to a controller. The control system may prevent an operator from moving the conveyor 520 in a direction and/or into a position that would cause the conveyor 520 and/or the articulated support arm 540 to contact components of the seed tender 500, personnel, or another object.

In some embodiments, control valves supply and control the flow of hydraulic fluid to the actuators. In some embodiments, the control valves are proportional control valves. In some embodiments, a hydraulic valve bank supplies the hydraulic fluid to and controls multiple actuators. Intermittently energizing more than one actuator at a time can speed up or slow down the flow rate of the hydraulic fluid to each actuator. The speed of each actuator may be monitored and when paired with proportional control valves, the speed of each actuator may be adjusted automatically. Proportional control valves may allow an operator or a control system to slow the movement when approaching a preset limit or an obstacle, or to prevent a collision. Slowing the movement may also alert an operator to a potential or imminent collision.

In some embodiments, one or more of the actuators 578, 608, 618, 620, 622 may be feedback actuators where the actuator includes one or more position sensors and/or switches configured to detect the position of the actuator. The sensors and/or switches of a feedback actuator may send signals to a controller. Feedback actuators may include sensors such as potentiometers, hall sensors, or optical feedback sensors, for example. Feedback actuators enable enhanced control capabilities and superior resolution for applications requiring positional control, tracking, or syncing. In some embodiments, the feedback actuators may be hydraulic cylinders having a hall sensor, extending within the cylinder rod of the hydraulic cylinder, and a magnet located outside of the cylinder rod. As the cylinder rod moves within the hydraulic cylinder, the hall sensor detects the magnet and outputs a signal indicating the position of the cylinder rod. The sensors and/or switches of a feedback actuator may send signals to a controller. The sensors and/or switches of a feedback actuator may be used to set position limits to prevent the conveyor 520 and/or the articulated support arm 540 from contacting components of the seed tender 500 such as the container 510, fender 634, and/or the conveyor rests 630, 632.

Figure 14:
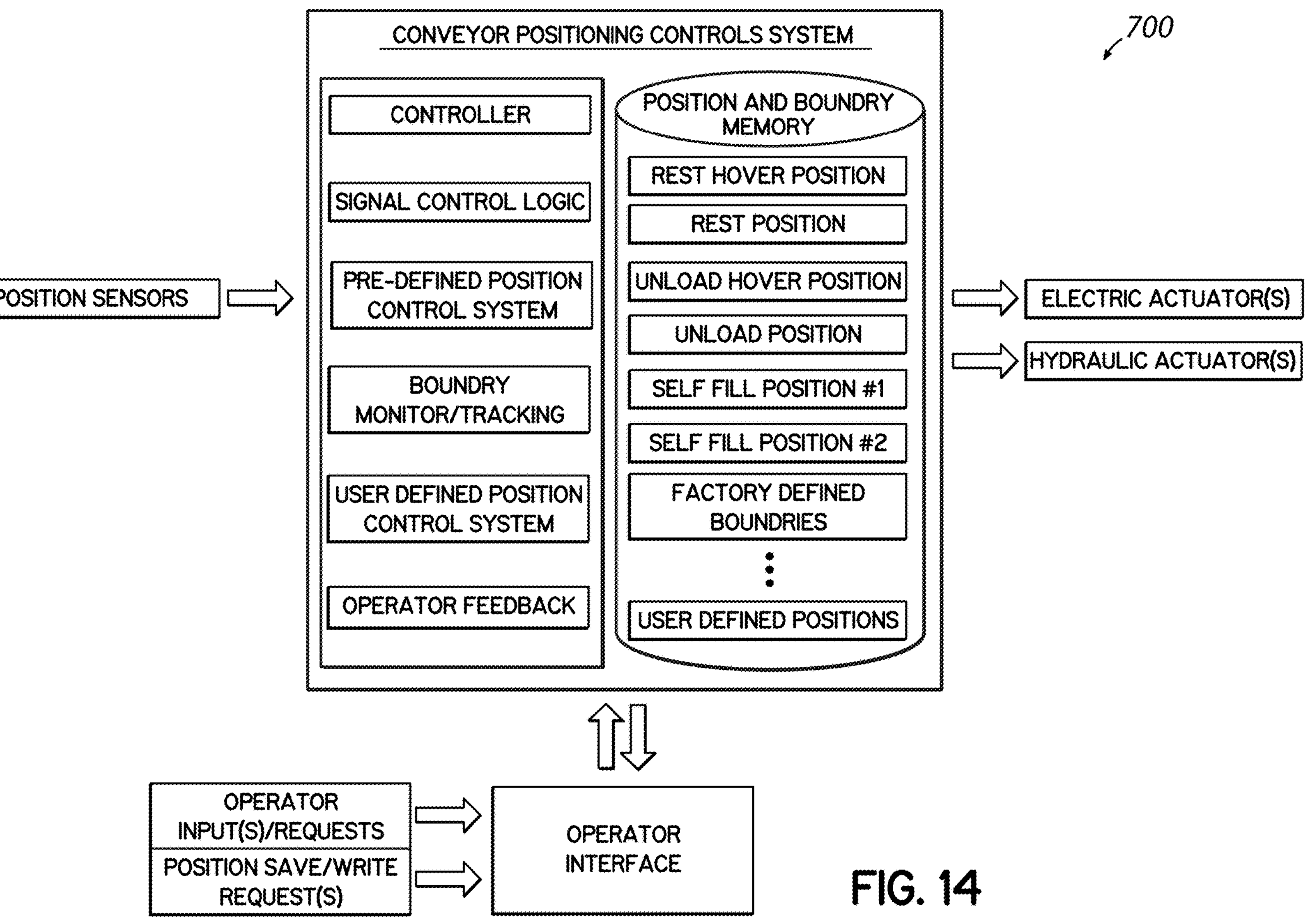
FIG. 14 shows an illustrative conveyor position control system.
Figure 15:
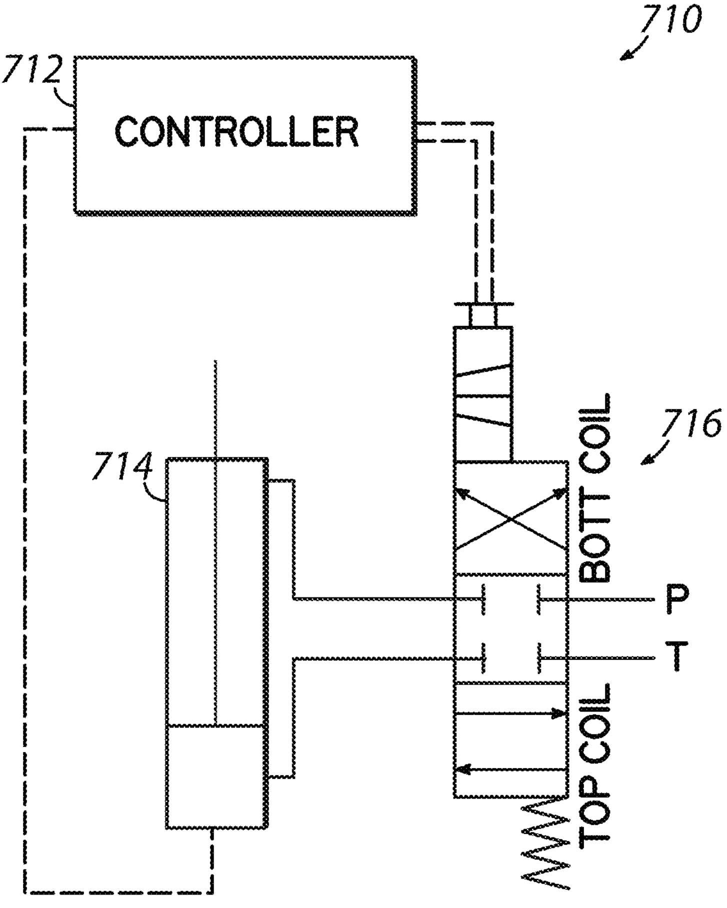
FIG. 15 shows an illustrative hydraulic control system.

FIG. 14 shows an illustrative conveyor position control system 700. FIG. 15 shows an illustrative control system 710 including a controller 712, such as a PLC for example, communicating with a feedback actuator 714 and a normally closed three position four-way valve 716. This type of valve may be used to control the swing actuator 150, 608 and/or the lift actuator 152, 578 on the seed tender 100, 500. FIG. 15 only shows a single actuator and a single valve for simplicity. Multiple actuators and valves can be connected and controlled simultaneously by a single controller.

Figure 16:
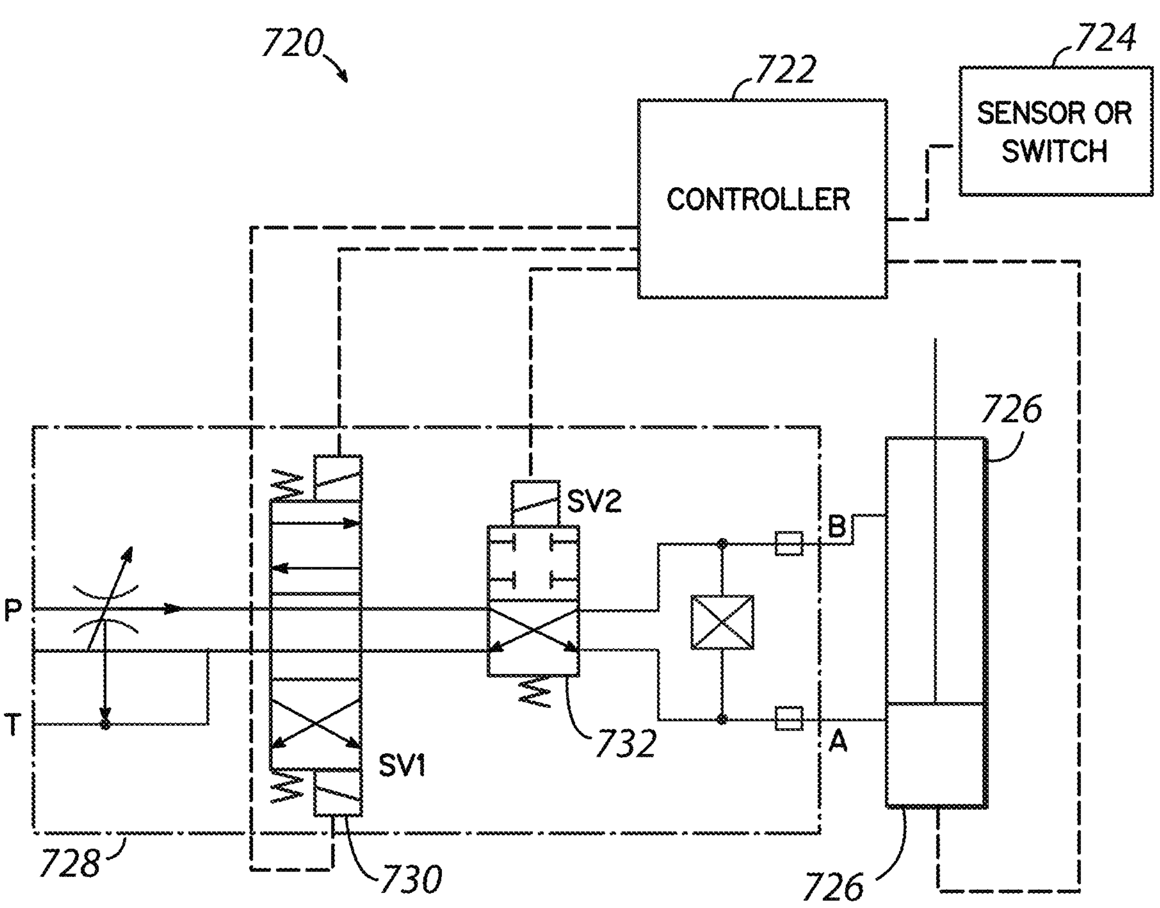
FIG. 16 shows an illustrative hydraulic float valve control system.

FIG. 16 shows an illustrative conveyor position control system 720 including a controller 722, such as a PLC for example, communicating with a sensor or switch 724 and a feedback actuator 726, and a hydraulic valve block 728 including a normally open three position four-way valve 730 in series with a normally open two position four-way valve 732. The combination of a normally open three position four-way valve 730 in series with a normally open two position four-way valve 732 may form a "hydraulic float valve." When both the normally open three position four-way valve 730 and the normally open two position four-way valve 732 are open, the hydraulic float valve is in a "float mode." When the hydraulic float valve is in the float mode, the hydraulic cylinder or hydraulic motor 726 is allowed to "float" or move freely and hydraulic fluid is allowed to flow back to the hydraulic power unit reservoir. In this illustrative embodiment, if there is a loss of power and/or control of the three position four-way valve 730 and the two position four-way valve 732, the three position four-way valve 730 and the two position four-way valve 732 will return to their normally open positions and the hydraulic cylinder or hydraulic motor 726 will be allowed to float. The system may also include a latch 536 configured to secure the ball 530 in the socket 532 when the conveyor 520 is in the unload configuration and a sensor or switch 534 configured to detect the position of the conveyor 520, see FIGS. 7 and 7A. When the sensor or switch 534 detects the conveyor 520 is in an unload position it will deenergize the normally open two position four-way valve which allows hydraulic fluid to float through the three position four-way valve which allows actuators 618, 620, and/or 622 to float or move freely. When the conveyor 520 is unlatched and the ball 530 is removed from the socket 532, the sensor or switch 534 completes the circuit to the two position four-way valve and locks the hydraulic cylinder or hydraulic motor in place. Then, movement of the conveyor 520 may be controlled by an operator by entering command inputs into a controller, for example. Command inputs may be entered into a controller by activating buttons or switches, for example. Based on the operator's inputs, power is applied to the three position four-way valve and temporarily removed from the two position four-way valve to allow flow to the three position four-way valve. FIG. 16 only shows a single actuator and two valves for simplicity. Multiple actuators and valves can be connected and controlled simultaneously by a single controller.

Figure 17:
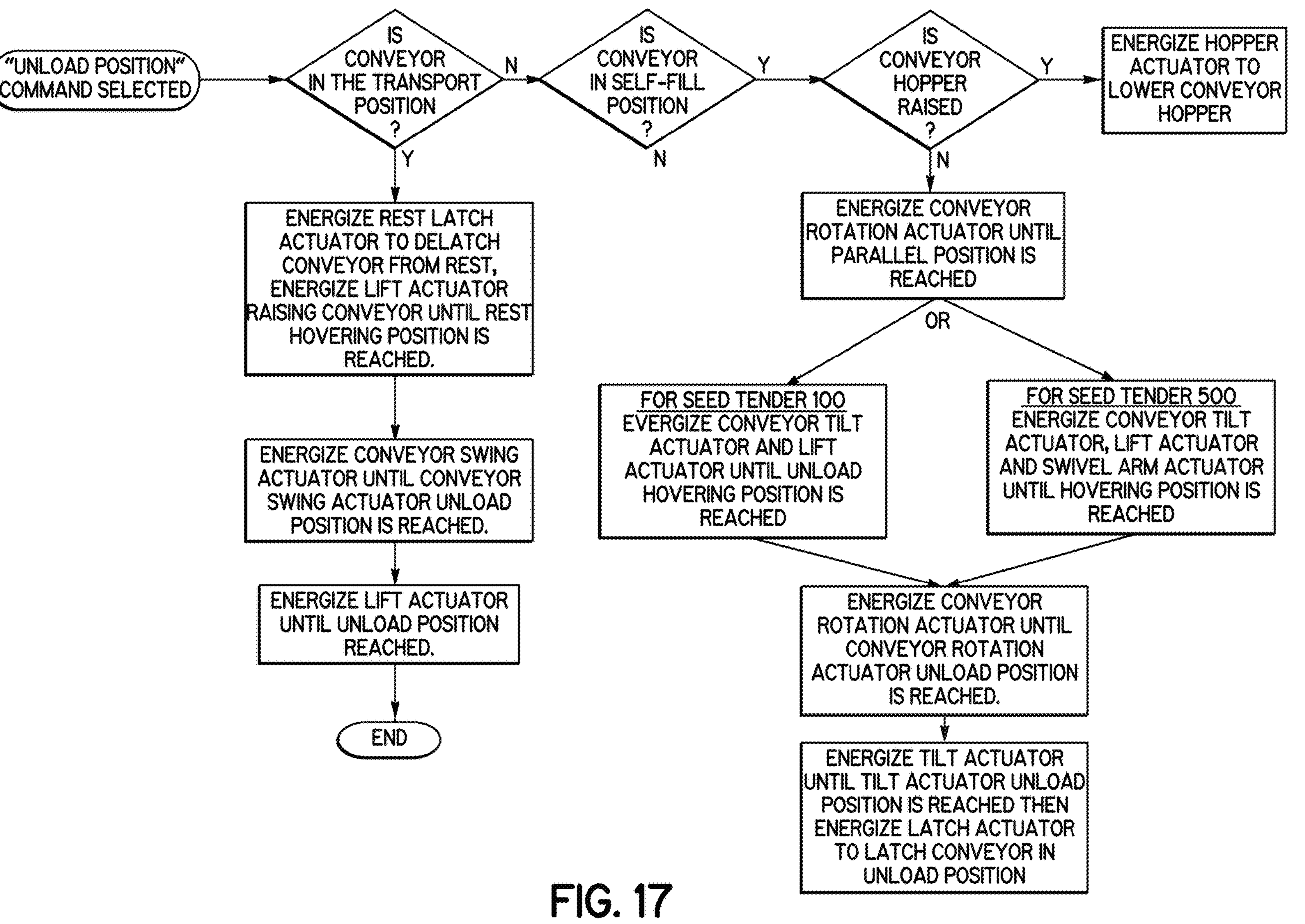
FIG. 17 is a simplified flow chart illustrating a control method or process executed by a controller when an "unload position" command is selected.
Figure 18:
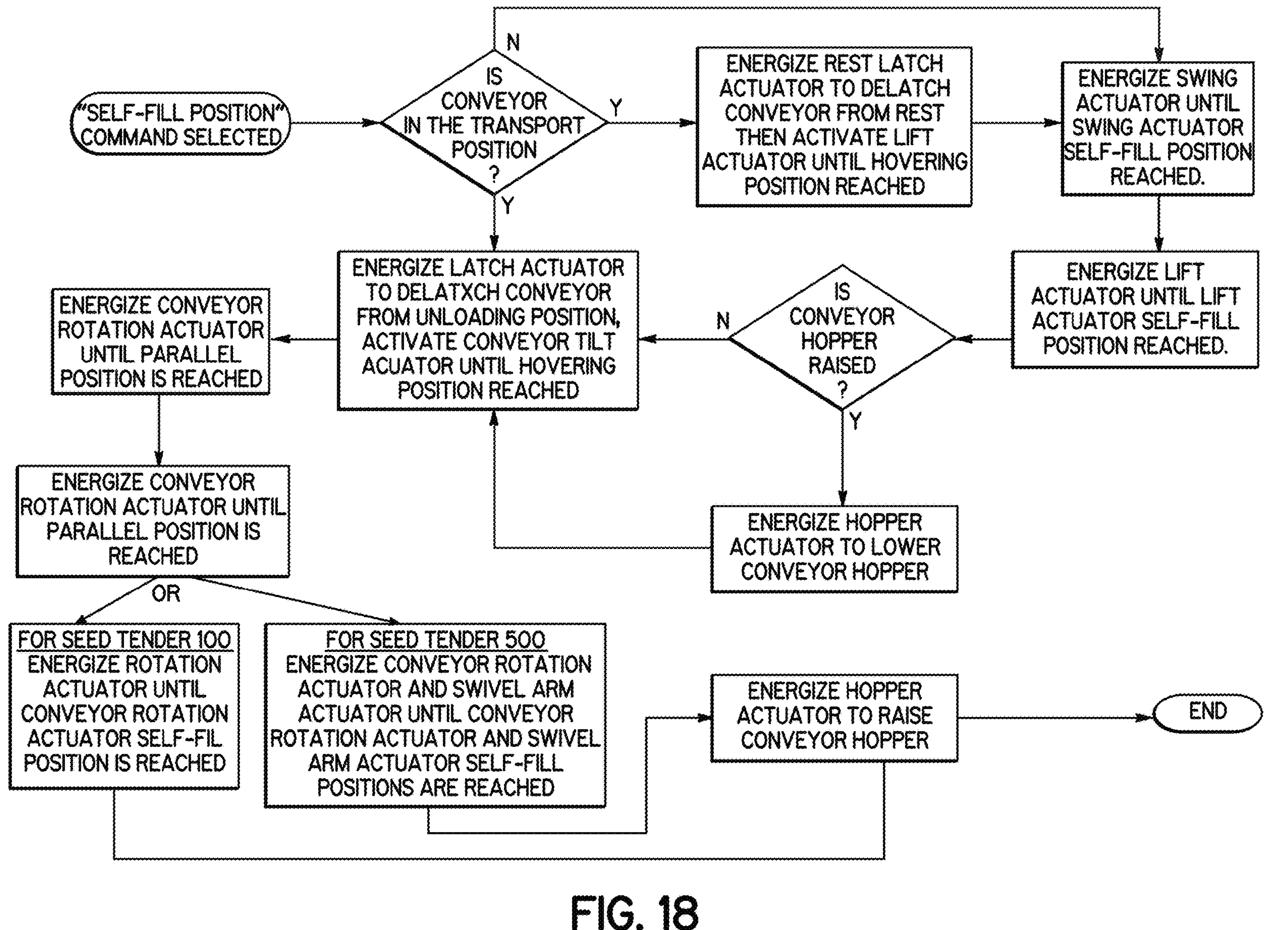
FIG. 18 is a simplified flow chart illustrating a control method or process executed by a controller when a "self-fill position" command is selected.
Figure 19:
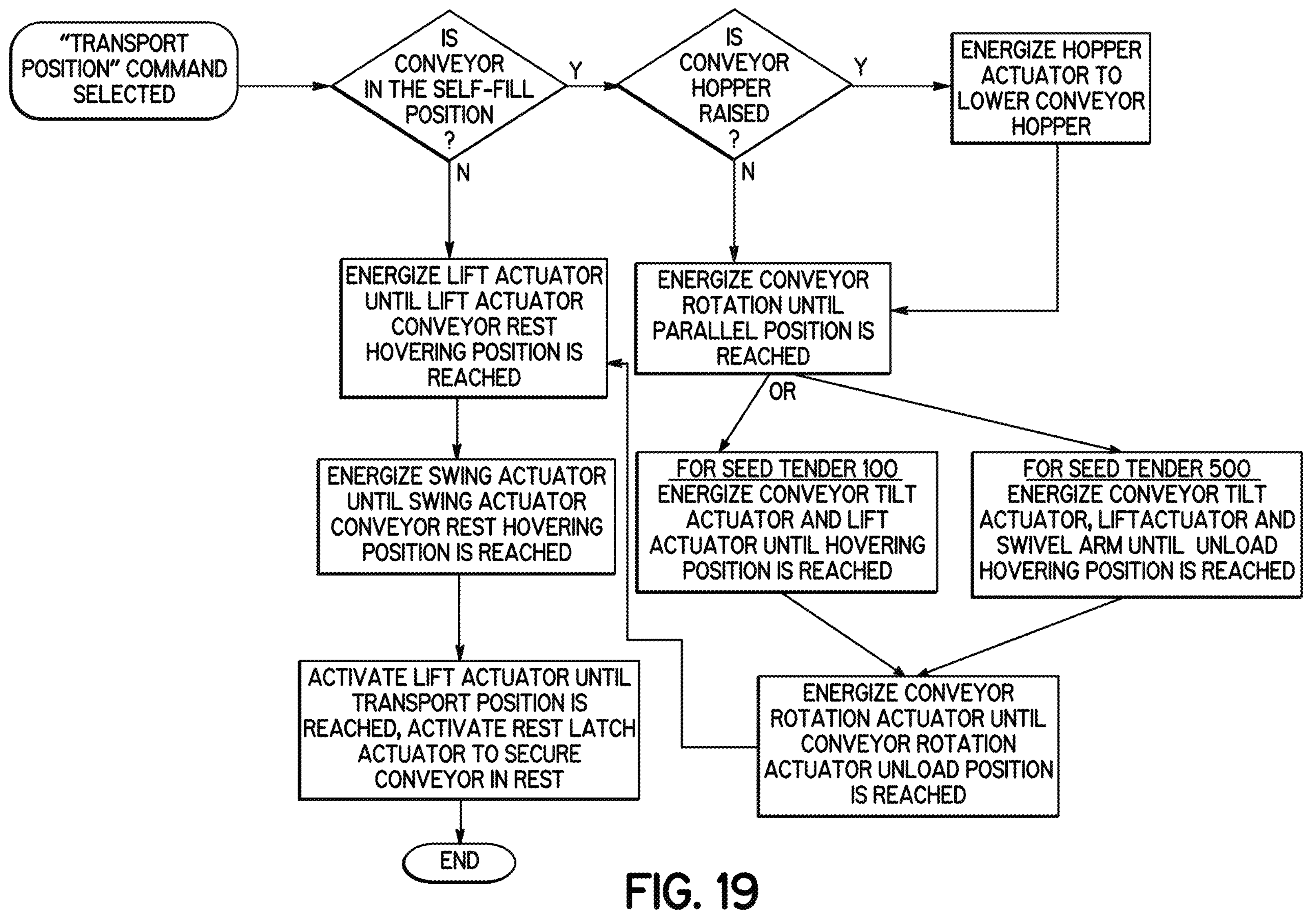
FIG. 19 is a simplified flow chart illustrating a control method or process executed by a controller when a "transport position" command is selected.

The illustrative flow charts, FIGS. 17-19, are illustrative examples of how the control programming may operate. It is to be understood there are many alternative ways to organize the programming logic to execute the commands. Key terms used in the flow charts are defined herein.

Referring to FIGS. 1 and 17-19, the conveyor 120 is in an "unload position" when the hopper 122 of the conveyor 120 is positioned under an outlet 112 of the container 110 and the discharge spout 126 of the conveyor 120 is positioned to discharge seed into a receiving container, such as a seed bin of a planter, for example. Referring to FIG. 1, the conveyor 120 is in the "unload hovering position" when the inlet end portion 124 of the conveyor 120 is above the fender 172 and below the container 110. The unload hovering position at least partially defines an angle or range of angles where the inlet end portion 124 can be moved into or out of an unload position under the container 110. It should be noted it may be necessary to have multiple hovering positions at various conveyor positions to move the inlet end portion 124 below the container 110 and above the fender 172. For simplicity, only one unload hovering position is indicated in the flow charts. The conveyor 120 is in the "parallel position" when the conveyor 120 is approximately parallel to the container 110 and the parallel position ensures the conveyor 120 is clear from the container 110 and other portions of the seed tender 100. Referring to FIG. 5, the conveyor 120 is in the "self-fill position" when the outlet end portion 128 is positioned above the container 110 and the inlet end portion 124 is positioned to receive seed. Referring to FIGS. 2 and 6, the conveyor 120 is in the "transport position" when the conveyor 120 is in one of the conveyor rests 158, 160. The conveyor 120 is in the "rest hovering position" when the lift actuator 152 supports the conveyor 120 above one of the conveyor rests 158, 160 and below the container 110.

Referring to FIGS. 7 and 17-19, the conveyor 520 is in an "unload position" when the hopper 522 of the conveyor 520 is positioned under an outlet 512 of the container 510 and the discharge spout 526 of the conveyor 520 is positioned to discharge seed into a receiving container, such as a seed bin of a planter, for example. The conveyor 520 is in an "unload hovering position" when the inlet end portion 524 of the conveyor 520 is above the fender 634 and below the container 510. The unload hovering position at least partially defines an angle or range of angles where the inlet end portion 524 can be moved into or out of an unload position under the container 510. It should be noted it may be necessary to have multiple hovering positions at various conveyor positions to move the inlet end portion 524 below the container 510 and above the fender 634. For simplicity, only one unload hovering position is indicated in the flow charts. The conveyor 520 is in the "parallel position" when the conveyor 520 is approximately parallel to the container 510 and the parallel position ensures the conveyor 520 is clear from the container 510 and other portions of the seed tender 500. Referring to FIG. 12, the conveyor 520 is in the "self-fill position" when the outlet end portion 528 is positioned above the container 510 and the inlet end portion 524 is positioned to receive seed. Referring to FIGS. 9 and 13, the conveyor 520 is in the "transport position" when the conveyor 520 is in one of the conveyor rests 630, 632. The conveyor 520 is in the "rest hovering position" when the lift actuator 578 supports the conveyor 520 above one of the conveyor rests 630, 632 and below the container 510.

Methods of automatically controlling the complex movement of the conveyor 120 involving a control system and multiple actuators are described herein. FIG. 17 is a simplified flow chart illustrating a control method or process executed by a controller when an "unload position" command is selected. Referring to FIGS. 1 and 17, an operator may select an "unload position" command to automatically move the conveyor 120 to a predefined unload position, such as a factory pre-set for example, or an unload position set previously by an operator using a "learn" command to save the position in the control system. The unload position command automatically moves the conveyor 120 from any position into an unload position. This may be a typical location the conveyor moves to for the operator to take over control of an unload operation into their planter. For example, an operator with a large center fill planter may set the conveyor to go to a raised position perpendicular to the seed tender. Alternatively, an operator with a box planter or drill may set the conveyor to go to a lower position at an angle to the seed tender, so they can start on one end of the planter and unload from one side to the other. Multiple conveyor positions may be programmed by moving the conveyor to their desired position and using a "learn" command to save the position. The transport position may be rewritable where saving a new unload position would overwrite an old unload position. The programmed unload position may be password protected to prevent unauthorized personnel from programming an unload position. To ensure safety, an operator may need to hold a switch, for example, in an activated position for the duration of any automatic operation. If the operator releases the switch before the automatic operation is completed, the control system would stop the operation. Once the operator reactivates the switch, the control system would resume the automatic operation. The control system may include a jog function where the conveyor 120 would move an operator selected distance when a jog command is selected. A jog command may be used to move the conveyor 120 a set distance to fill multiple seed bins of a planter, for example.

FIG. 18 is a simplified flow chart illustrating a control method or process executed by a controller when a "self-fill position" command is selected. Referring to FIGS. 5 and 18, an operator may select a "self-fill position" command to automatically move the conveyor 120 to a predefined self-fill position, such as a factory pre-set for example, or a self-fill position set previously by an operator using a "learn" command to save the position in the control system. The self-fill position command automatically moves the conveyor 120 from any position into a self-fill position. The operator may also need to select the front or rear hopper 118*a*, 118*b*. Multiple self-fill positions may be programmed by moving the conveyor 120 to the desired position and using a "learn" command to save the position. Multiple self-fill positions may be programmed, such as a first position for the front hopper 118*a* and a second self-fill position for the rear hopper 118*b*. The self-fill position may be rewritable where saving a new self-fill position would overwrite an old unload position. The programmed self-fill position may be password protected to prevent unauthorized personnel from programming an self-fill position.

FIG. 19 is a simplified flow chart illustrating a control method or process executed by a controller when a "transport position" command is selected. Referring to FIGS. 6 and 19, an operator may select a "transport position" command to move the conveyor 120 into a conveyor rest 158, 160. Selecting the transport position command may also secure the conveyor 120 to a conveyor rest 158, 160. The transport position command automatically moves the conveyor 120 from any position into a transport position. The control system may move the conveyor to the front or rear conveyor rest 158, 160 as a default transport position based on a programmed operator preference. In some embodiments, the operator may select the front or rear conveyor rest 158, 160. Once the conveyor reaches the transport position, one or more latches may secure the conveyor 120 to the rest 158, 160 before road transport. In some embodiments, the latches may automatically secure the conveyor 120 to the rest 158, 160 when the conveyor 120 is in the transport position. In some embodiments, the latches may include actuators, and when energized the actuators activate the latches securing the conveyor 120 to the rest 158, 160. The latch actuators may be electric solenoids, linear actuators, hydraulic cylinders, or any other type of actuator configured to activate a latch. In some embodiments, a conveyor transport position may be programmed by moving the conveyor 120 to the desired position and using a "learn" command to save the position in the control system. The transport position may be rewritable where saving a new transport position would overwrite an old transport position. The programmed transport position may be password protected to prevent unauthorized personnel from programming a transport position.

Methods of automatically controlling the complex movement of the conveyor 520 involving a control system and multiple actuators are described herein. Referring to FIGS. 7 and 17, an operator may select an "unload position" command to automatically move the conveyor 520 to a predefined unload position, such as a factory pre-set for example, or an unload position set previously by an operator using a "learn" command to save the position in the control system. The unload position command automatically moves the conveyor 520 from any position into an unload position. This may be a typical location the conveyor moves to for the operator to take over control of an unload operation into their planter. For example, an operator with a large center fill planter may set the conveyor 520 to go to a raised position perpendicular to the seed tender 500. Alternatively, an operator with a box planter or drill may set the conveyor to go to a lower position at an angle to the seed tender, so they can start on one end of the planter and load the box planter from one side to the other. Multiple conveyor positions may be programmed by moving the conveyor to their desired position and using a "learn" command to save the position. The transport position may be rewritable where saving a new unload position would overwrite an old unload position. The programmed unload position may be password protected to prevent unauthorized personnel from programming an unload position. The control system may include a jog function where the conveyor 520 would move a set distance when a jog command is selected. A jog command may be used to move the conveyor 520 an operator selected distance to fill multiple seed bins of a planter, for example.

Referring to FIGS. 12 and 18, an operator may select a "self-fill position" command to automatically move the conveyor 520 to a predefined self-fill position, such as a factory pre-set for example, or a self-fill position set previously by an operator using a "learn" command to save the position in the control system. The self-fill position command automatically moves the conveyor 520 from any position into a self-fill position. The operator may also need to select the front or rear hopper 518*a*, 518*b*. Multiple self-fill positions may be programmed by moving the conveyor 120 to the desired position and using a "learn" command to save the position. Multiple self-fill positions may be programmed, such as a first position for the front hopper 518*a* and a second self-fill position for the rear hopper 518*b*. The self-fill position may be rewritable where saving a new self-fill position would overwrite an old unload position. The programmed self-fill position may be password protected to prevent unauthorized personnel from programming an self-fill position.

Referring to FIGS. 13 and 19, an operator may select a "transport" command to move the conveyor 520 into a conveyor rest 630, 632. Selecting the transport position command may also secure the conveyor 520 to a conveyor rest 630, 632. The transport position command automatically moves the conveyor 520 from any position into a transport position. The control system may automatically select the front or rear conveyor rest 630, 632 by determining the position of the swivel arm actuator 618 when the transport position command is selected. When the swivel arm actuator 618 is closer to being fully retracted, the conveyor 520 would be moved to the front rest 630. When the swivel arm 546 actuator 618 is closer to being fully extended, the conveyor 520 would be moved to the rear rest 632. A rotary sensor or rotary encoder may also be used to track the location of the swivel arm 546 if a hydraulic motor or helical actuator is used. In some embodiments, the operator may select the front or rear conveyor rest 630, 632. In some embodiments, the operator may select to move the conveyor 520 from the front conveyor rest 630 to the rear conveyor rest 632 or vice versa. Once the conveyor reaches the transport position, one or more latches may secure the conveyor 520 to the rest 630, 632 before road transport. In some embodiments, the latches may automatically secure the conveyor 520 to the rest 630, 632 when the conveyor 520 is in the transport position. In some embodiments, the latches may include actuators, and when energized the actuators activate the latches securing the conveyor 520 to the rest 630, 632. The latch actuators may be electric solenoids, linear actuators, or any other type of actuator configured to activate a latch. In some embodiments, a conveyor transport position may be programmed by moving the conveyor 520 to the desired position and using a "learn" command to save the position in the control system. The transport position may be rewritable where saving a new transport position would overwrite an old transport position. The programmed transport position may be password protected to prevent unauthorized personnel from programming a transport position.

A more advanced method may utilize control system configured with an "auto position" command to allow a conveyor to autonomously move to a position to unload seed into a planter, for example. The control system may include one or more sensors such as radar, lidar, and/or cameras configured to identify objects or people. The sensors may be configured to identify receiving containers, such as seed hoppers, for example. In some embodiments, one or more sensors mounted on the discharge end of the conveyor may be configured to locate unloading positions. In some embodiments, an identifiable tag may be placed on top of each hopper. The system may be configured to read the tags and move to each one while avoiding obstacles along the conveyor's path. Once the conveyor is positioned above a hopper, the conveyor may unload a specific weight before identifying the next tag and moving to the next hopper. In some embodiments, one or more sensors mounted on the side of the container or on the conveyor may be configured to detect people and prevent pinching people between the conveyor and the container, for example. With radar, lidar, and/or cameras, for example, the system may detect and avoid hitting obstacles as well. This may be a safety feature to keep people and objects from being struck and/or pinched.

In some embodiments, the movement of the actuators may be timed. For instance, to move the conveyor into a transport position, an actuation sequence may energize one or more actuators for a predetermined period to move the conveyor into position. It should be understood this method would only work if the speed of the movements were highly consistent and may not work well for obstacle avoidance.

Figure 20:
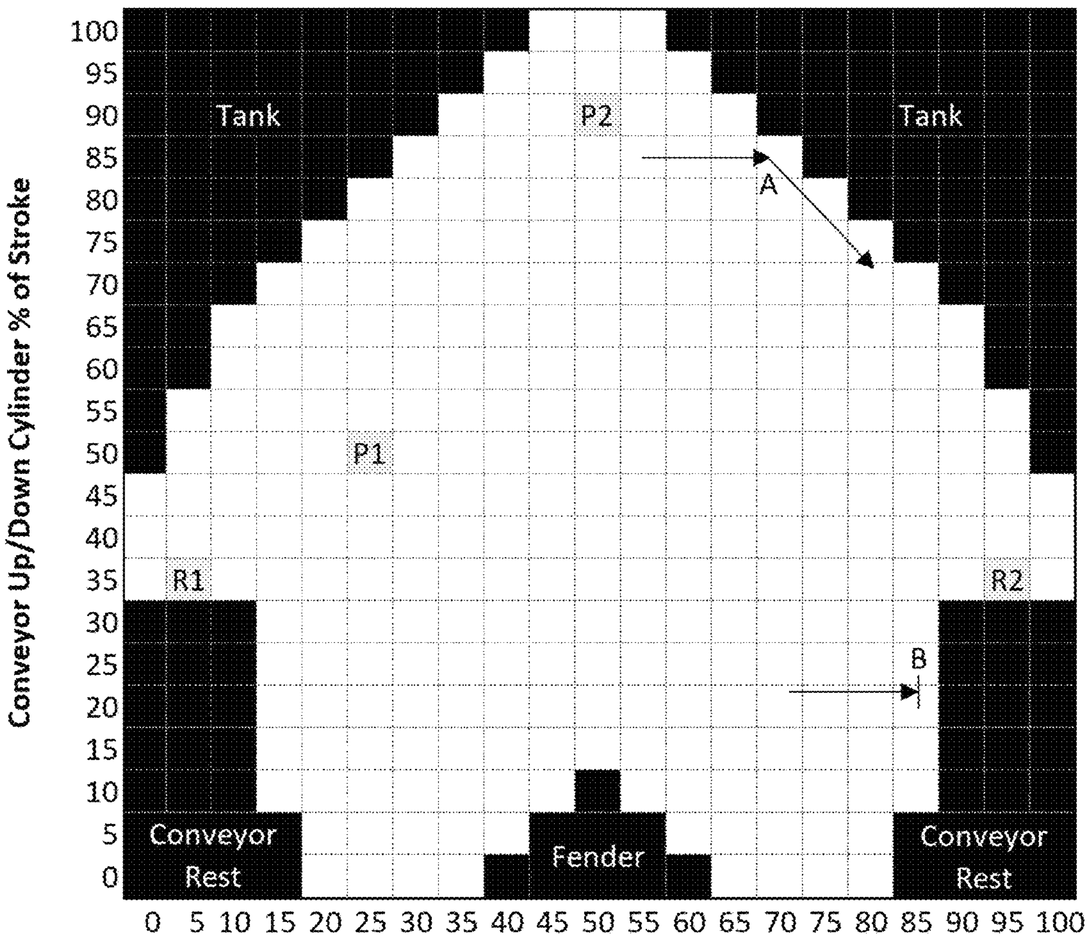
FIG. 20 is a simplified programming chart showing an operational boundary set.

In some embodiments, operational boundaries may be programmed into the controller to ensure moving components of the seed tender 100, 500 do not come into contact with stationary components of the seed tender 100, 500. FIG. 20 is a simplified programming chart showing an operational boundary set that may be used to ensure the conveyor 120, 520 and/or the support arm 140, 540 do not contact the container 110, 510, conveyor rests 158, 160, 630, 632, and/or fender 172, 634 when in an unloading mode. The black areas represent coordinates the conveyor 120, 520 and/or the support arm 140, 540 would avoid. The control program would control the movement of the conveyor 120, 520 while preventing the conveyor 120, 520 and/or the support arm 140, 540 from contacting other components of the seed tender 100, 500. In this programming chart, R1 and R2 represent the transport positions and P1 and P2 are examples of conveyor positions set by an operator for filling different planters. The operational boundaries set would be an additional and/or different set of boundaries when the conveyor 120, 520 is in a self-fill mode. It should be understood a more complex or even 3D version of the programming chart may be required to program operational boundaries.

FIG. 20 also shows examples of control of the positioning of the conveyor 120, 520. For example, point A shows the position, movement, and control of the conveyor 120, 520. An energized swing actuator may move the conveyor 120, 520 toward the container 110, 510 and, if the rate of change of one direction is low enough to avoid a collision with the desired direction still activated, the control system may energize a lift actuator to avoid a collision with the container 110, 510. Point B shows an energized swing actuator moving the conveyor 120, 520 toward the container 110, 510. This would make the control system more operator friendly than a system which stops anytime the conveyor 120, 520 approaches a boundary requiring another direction be activated. The control system may deenergize the swing actuator to avoid collision with the conveyor rest 160, 632 since the rate of change cannot be achieved from the conveyor up/down actuator to avoid collision. In this case, the operator would need to press the conveyor up button until the conveyor 110, 510 is above the conveyor rest 160, 632.

Automatic conveyor positioning may be added to a seed tender by installing an automated control kit. A kit for adding automated control to a seed tender may include a sensor system and an electronic control unit. The sensor system may be configured to detect at least one of an object in a path of movement of the conveyor, a position of the conveyor, or an orientation of the conveyor. The electronic control unit may be configured to receive a signal from the sensor system and to selectively energize and de-energize at least one actuator based at least in part on the signal from the sensor system. Selectively energizing and de-energizing the actuator moves the conveyor. The controlled movement of the conveyor caused by the actuator is at least partially based on at least one of the detected object, the detected position of the conveyor, or the detected orientation of the conveyor. The kit may also include an actuator configured to be operatively coupled to the conveyor and configured to selectively control the movement of the conveyor about a first axis of rotation when the actuator is energized. The electronic control unit may be configured to receive a signal from the sensor system and to selectively energize and de-energize the actuator based at least in part on the signal from the sensor system. The kit may include a second actuator configured to be operatively coupled to the conveyor and configured to selectively control the movement of the conveyor about the second axis of rotation when the second actuator is energized. The electronic control unit may be configured to receive a signal from the sensor system and to selectively energize and de-energize the second actuator based at least in part on the signal from the sensor system. The electronic control unit may be configured to be programmed to selectively move the conveyor into at least one of a transport position, an unload position, or a self-fill position. The electronic control unit may be configured to selectively store a signal from the sensor system when the conveyor is in an operator selected position thereby programming the electronic control unit. The electronic control unit may be configured to selectively energize and de-energize one or more actuators to move the conveyor into the operator selected position.

The kit sensor system may include a first sensor configured to detect at least one of an object in a path of movement of the conveyor, a position of the conveyor, or an orientation of the conveyor and send a signal to the electronic control unit. The sensor system may include a second sensor configured to detect at least one of an object in a path of movement of the conveyor, a position of the conveyor, or an orientation of the conveyor and send a signal to the electronic control unit. The electronic control unit may be configured to receive signals from the first sensor and the second sensor and to selectively energize and de-energize one or more actuators based at least in part on the signals from the first sensor and the second sensor. The electronic control unit may be configured to selectively store a signal from the first sensor and a signal from the second sensor when the conveyor is in an operator selected position thereby programming the electronic control unit.

While the present invention has been illustrated by the description of specific embodiments thereof, and while the embodiments have been described in considerable detail, it is not intended to restrict or in any way limit the scope of the appended claims to such detail. While the device described herein has been illustrated as an integral part of a seed tender, it should be understood by one of ordinary in the art that the invention may be employed in other applications. The various features discussed herein may be used alone or in any combination within and between the various embodiments. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A seed tender comprising:

a supplying container configured to hold seed;

a conveyor operatively coupled to the supplying container and configured to transfer the seed from the supplying container to a receiving container and configured to rotate about a first axis of rotation and a second axis of rotation and to be selectively moved into at least one of a transport position, an unload position, or a self-fill position;

a first actuator operatively coupled to the conveyor and configured to selectively control the movement of the conveyor about the first axis of rotation when the first actuator is energized;

a second actuator operatively coupled to the conveyor and configured to selectively control the movement of the conveyor about the second axis of rotation when the second actuator is energized;

a sensor system configured to detect at least one of an object in a path of movement of the conveyor, a position of the conveyor, or an orientation of the conveyor; and an electronic control unit configured to receive a signal from the sensor system and to selectively energize and de-energize the first actuator and the second actuator based at least in part on the signal from the sensor system;

wherein the controlled movement of the conveyor caused by the first actuator and the second actuator is at least partially based on at least one of the detected object, the detected position of the conveyor, or the detected orientation of the conveyor.

2. The seed tender of claim 1 wherein the electronic control unit is further configured to be programmed to selectively move the conveyor into at least one of the transport position, the unload position, or the self-fill position.

3. The seed tender of claim 1 wherein the electronic control unit is further configured to selectively store a signal from the sensor system when the conveyor is in an operator selected position thereby programming the electronic control unit, and wherein the electronic control unit is further configured to selectively energize and de-energize the first actuator and the second actuator to move the conveyor into the operator selected position.

4. The seed tender of claim 1 wherein the sensor system comprises:

a first sensor configured to detect at least one of an object in a path of movement of the conveyor, a position of the conveyor, or an orientation of the conveyor; and a second sensor configured to detect at least one of an object in a path of movement of the conveyor, a position of the conveyor, or an orientation of the conveyor; and the electronic control unit is further configured to receive signals from the first sensor and the second sensor and to selectively energize and de-energize the first actuator and the second actuator based at least in part on the signals from the first sensor and the second sensor.

5. The seed tender of claim 1, further comprising an unload position latch configured to secure an inlet end of the conveyor; and an unload position latch actuator configured to activate the unload position latch to at least one of secure the inlet end of the conveyor when the conveyor is moved into the unload position or release the inlet end of the conveyor when the conveyor is moved out of the unload position.

6. The seed tender of claim 1, further comprising a transport position latch configured to secure the conveyor when the conveyor is in the transport position; and a transport position latch actuator configured to activate the transport position latch to at least one of secure the conveyor when the conveyor is moved into the transport position or release the conveyor when the conveyor is moved out of the transport position.

7. The seed tender of claim 1, further comprising a hydraulic float valve operatively coupled to at least one of the first actuator or the second actuator;

wherein when the hydraulic float valve is in a valve float mode, at least one of the first actuator or the second actuator is in an actuator float mode and the conveyor is free to rotate about at least one of the first axis of rotation or the second axis of rotation.

8. The seed tender of claim 7, wherein the unload position comprises a first unload position; and wherein the hydraulic float valve is in the valve float mode when the conveyor moves between the first unload position and a second unload position.

9. The seed tender of claim 7, wherein the hydraulic float valve is in the valve float mode when the conveyor moves between the transport position and the unload position.

10. A seed tender comprising:

a supplying container configured to hold seed;

a conveyor operatively coupled to the supplying container and configured to transfer the seed from the supplying container to a receiving container and configured to rotate about a first axis of rotation, a second axis of rotation, and a third axis of rotation, and to be selectively moved into at least one of a transport position, an unload position, or a self-fill position;

a first actuator operatively coupled to the conveyor and configured to selectively control the movement of the conveyor about the first axis of rotation when the first actuator is energized;

a second actuator operatively coupled to the conveyor and configured to selectively control the movement of the conveyor about the second axis of rotation when the second actuator is energized;

a third actuator operatively coupled to the conveyor and configured to selectively control the movement of the conveyor about the third axis of rotation when the third actuator is energized;

a sensor system configured to detect at least one of an object in a path of movement of the conveyor, a position of the conveyor, or an orientation of the conveyor; and an electronic control unit configured to receive a signal from the sensor system and to selectively energize and de-energize the first actuator, the second actuator, and the third actuator based at least in part on the signal from the sensor system;

wherein the controlled movement of the conveyor caused by the first actuator, the second actuator, and the third actuator is at least partially based on at least one of the detected object, the detected position of the conveyor, or the detected orientation of the conveyor.

11. The seed tender of claim 10 wherein the electronic control unit is further configured to be programmed to selectively move the conveyor into at least one of the transport position, the unload position, or the self-fill position.

12. The seed tender of claim 10 wherein the electronic control unit is further configured to selectively store a signal from the sensor system when the conveyor is in an operator selected position thereby programming the electronic control unit, and wherein the electronic control unit is further configured to selectively energize and de-energize the first actuator, the second actuator, and the third actuator to move the conveyor into the operator selected position.

13. The seed tender of claim 10 wherein the sensor system comprises:

a first sensor configured to detect at least one of an object in a path of movement of the conveyor, a position of the conveyor, or an orientation of the conveyor; and a second sensor configured to detect at least one of an object in a path of movement of the conveyor, a position of the conveyor, or an orientation of the conveyor; and the electronic control unit is further configured to receive signals from the first sensor and the second sensor and to selectively energize and de-energize the first actuator, the second actuator, and the third actuator based at least in part on the signals from the first sensor and the second sensor.

14. The seed tender of claim 10, further comprising an unload position latch configured to secure an inlet end of the conveyor; and an unload position latch actuator configured to activate the unload position latch to at least one of secure the inlet end of the conveyor when the conveyor is moved into the unload position or release the inlet end of the conveyor when the conveyor is moved out of the unload position.

15. The seed tender of claim 10, further comprising a transport position latch configured to secure the conveyor when the conveyor is in the transport position; and a transport position latch actuator configured to activate the transport position latch to at least one of secure the conveyor when the conveyor is moved into the transport position or release the conveyor when the conveyor is moved out of the transport position.

16. The seed tender of claim 10, further comprising a hydraulic float valve operatively coupled to at least one of the first actuator, the second actuator, or the third actuator;

wherein when the hydraulic float valve is in a valve float mode, at least one of the first actuator, the second actuator, or the third actuator is in an actuator float mode and the conveyor is free to rotate about at least one of the first axis of rotation, the second axis of rotation, or the third axis of rotation.

17. The seed tender of claim 16, wherein the unload position comprises a first unload position; and wherein the hydraulic float valve is in the valve float mode when the conveyor moves between the first unload position and a second unload position.

18. The seed tender of claim 16, wherein the hydraulic float valve is in the valve float mode when the conveyor moves between the transport position and the unload position.

19. A seed tender comprising:

a frame;

a supplying container coupled to the frame and configured to hold seed;

a support arm movably coupled to at least one of the frame or the supplying container;

a conveyor configured to transfer the seed from the supplying container to a receiving container, the conveyor being movably coupled to the support arm, and the conveyor being configured to rotate about a first axis of rotation, a second axis of rotation, and a third axis of rotation and to be selectively moved into at least one of a transport position, an unload position, or a self-fill position;

a first actuator coupled to at least one of the frame, the supplying container, the support arm, or the conveyor and configured to selectively control the movement of the conveyor about the first axis of rotation when the first actuator is energized;

a second actuator coupled to at least one of the frame, the supplying container, the support arm, or the conveyor and configured to selectively control the movement of the conveyor about the second axis of rotation when the second actuator is energized;

a third actuator coupled to at least one of the support arm or the conveyor and configured to selectively control the movement of the conveyor about the third axis of rotation when the third actuator is energized;

a sensor system configured to detect at least one of an object in a path of movement of the conveyor, a position of the conveyor, or an orientation of the conveyor; and an electronic control unit configured to receive signals from the sensor system and to energize the first actuator, the second actuator, and the third actuator based at least in part on the signal from the sensor system;

wherein the controlled movement of the conveyor caused by the first actuator, the second actuator, and the third actuator is at least partially based on at least one of the detected object, the detected position of the conveyor, or the detected orientation of the conveyor.

20. The seed tender of claim 19 wherein the electronic control unit is further configured to be programmed to selectively move the conveyor into at least one of the transport position, the unload position, or the self-fill position.

21. The seed tender of claim 19 wherein the electronic control unit is further configured to selectively store a signal from the sensor system when the conveyor is in an operator selected position thereby programming the electronic control unit, and wherein the electronic control unit is further configured to selectively energize and de-energize the first actuator, the second actuator, and the third actuator to move the conveyor into the operator selected position.

22. The seed tender of claim 19 wherein the sensor system comprises:

a first sensor configured to detect at least one of an object in a path of movement of the conveyor, a position of the conveyor, or an orientation of the conveyor; and a second sensor configured to detect at least one of an object in a path of movement of the conveyor, a position of the conveyor, or an orientation of the conveyor; and the electronic control unit is further configured to receive signals from the first sensor and the second sensor and to selectively energize and de-energize the first actuator, the second actuator, and the third actuator based at least in part on the signals from the first sensor and the second sensor.

23. The seed tender of claim 19 wherein the conveyor is further configured to rotate about a fourth axis of rotation;

wherein the seed tender further comprises a fourth actuator coupled to at least one of the support arm or the conveyor and configured to selectively control the movement of the conveyor about the fourth axis of rotation when the fourth actuator is energized;

wherein the electronic control unit is further configured to energize the fourth actuator based at least in part on the signal from the sensor system.

24. The seed tender of claim 23 wherein the electronic control unit is further configured to selectively store a signal from the sensor system when the conveyor is in an operator selected position thereby programming the electronic control unit, and wherein the electronic control unit is further configured to selectively energize and de-energize the first actuator, the second actuator, the third actuator, and the fourth actuator to move the conveyor into the operator selected position.

25. The seed tender of claim 23 wherein the conveyor is further configured to rotate about a fifth axis of rotation;

wherein the seed tender further comprises a fifth actuator coupled to at least one of the support arm or the conveyor and configured to selectively control the movement of the conveyor about the fifth axis of rotation when the fifth actuator is energized;

wherein the electronic control unit is further configured to energize the fifth actuator based at least in part on the signal from the sensor system.

26. The seed tender of claim 25 wherein the electronic control unit is further configured to selectively store a signal from the sensor system when the conveyor is in an operator selected position thereby programming the electronic control unit, and wherein the electronic control unit is further configured to selectively energize and de-energize the first actuator, the second actuator, the third actuator, the fourth actuator, and the fifth actuator to move the conveyor into the operator selected position.

27. The seed tender of claim 25 wherein the support arm comprises:

an inner support arm including a first inner support arm end portion movably coupled to at least one of the frame or the supplying container and a second inner support arm end portion; and an outer support arm including a first outer support arm end portion movably coupled to a second inner support arm end portion and a second outer support arm end portion;

wherein the conveyor is movably coupled to the second outer support arm end portion, and wherein the fifth actuator is coupled to the inner support arm and the outer support arm and is configured to move the outer support arm relative to the inner support arm.

28. The seed tender of claim 19 wherein the sensor system further comprises a tilt angle sensor configured to detect a tilt angle of the conveyor;

wherein the electronic control unit is further configured to receive a signal from the tilt angle sensor, and wherein the controlled movement of the conveyor caused by the first actuator, the second actuator, and the third actuator is based at least partially on the detected tilt angle of the conveyor.

29. The seed tender of claim 19, further comprising an unload position latch configured to secure an inlet end of the conveyor; and an unload position latch actuator configured to activate the unload position latch to at least one of secure the inlet end of the conveyor when the conveyor is moved into the unload position or release the inlet end of the conveyor when the conveyor is moved out of the unload position.

30. The seed tender of claim 19, further comprising a transport position latch configured to secure the conveyor when the conveyor is in the transport position; and a transport position latch actuator configured to activate the transport position latch to at least one of secure the conveyor when the conveyor is moved into the transport position or release the conveyor when the conveyor is moved out of the transport position.

31. The seed tender of claim 19, further comprising a hydraulic float valve operatively coupled to at least one of the first actuator, the second actuator, or the third actuator;

wherein when the hydraulic float valve is in a valve float mode, at least one of the first actuator, the second actuator, or the third actuator is in an actuator float mode and the conveyor is free to rotate about at least one of the first axis of rotation, the second axis of rotation, or the third axis of rotation.

32. The seed tender of claim 31, wherein the unload position comprises a first unload position; and wherein the hydraulic float valve is in the valve float mode when the conveyor moves between the first unload position and a second unload position.

33. The seed tender of claim 31, wherein the hydraulic float valve is in the valve float mode when the conveyor moves between the transport position and the unload position.

34. A method of positioning a conveyor, the method comprising:

detecting at least one of an object in a path of movement of a conveyor, a position of the conveyor, or an orientation of the conveyor;

selectively energizing and de-energizing a first actuator to selectively move the conveyor around a first axis of rotation based at least in part on the detected object, the detected position of the conveyor, or the detected orientation of the conveyor; and selectively energizing and de-energizing a second actuator to selectively move the conveyor around a second axis of rotation based at least in part on the detected object, the detected position of the conveyor, or the detected orientation of the conveyor.

35. The method of claim 34, further comprising selectively energizing and de-energizing at least one of the first actuator or the second actuator to selectively move the conveyor into at least one of a transport position, an unload position, or a self-fill position.

36. The method of claim 34, further comprising:

detecting an operator selected position; and selectively energizing and de-energizing at least one of the first actuator or the second actuator to selectively move the conveyor into the operator selected position.

37. The method of claim 34, further comprising:

receiving an electronic signal; and selectively energizing and de-energizing at least one of the first actuator or the second actuator based at least in part on the electronic signal.

38. The method of claim 37, further comprising:

storing the electronic signal; and selectively energizing and de-energizing at least one of the first actuator or the second actuator based at least in part on the stored electronic signal.

39. The method of claim 34, further comprising selectively placing at least one of the first actuator or the second actuator in an actuator float mode thereby allowing the conveyor to move freely around at least one of the first axis of rotation or the second axis of rotation.

40. The method of claim 34, further comprising activating an unload position latch to at least one of secure the conveyor when the conveyor is moved into an unload position or release the conveyor when the conveyor is moved out of the unload position.

41. The method of claim 34, further comprising activating a transport position latch to at least one of secure the conveyor when the conveyor is moved into a transport position or release the conveyor when the conveyor is moved out of the transport position.

42. The method of claim 34, further comprising selectively energizing and de-energizing a third actuator to selectively move the conveyor around a third axis of rotation based at least in part on the detected object, the detected position of the conveyor, or the detected orientation of the conveyor.

43. The method of claim 42, further comprising selectively energizing and de-energizing a fourth actuator to selectively move the conveyor around a fourth axis of rotation based at least in part on the detected object, the detected position of the conveyor, or the detected orientation of the conveyor.

44. The method of claim 43, further comprising selectively energizing and de-energizing a fifth actuator to selectively move the conveyor around a fifth axis of rotation based at least in part on the detected object, the detected position of the conveyor, or the detected orientation of the conveyor.

* * * * *